United States Patent
Watanabe

(10) Patent No.: US 9,894,095 B2
(45) Date of Patent: Feb. 13, 2018

(54) NETWORK OF ELECTRONIC APPLIANCES AND A SEMICONDUCTOR DEVICE IN THE NETWORK

(71) Applicant: Hiroshi Watanabe, Kanagawa-ken (JP)

(72) Inventor: Hiroshi Watanabe, Kanagawa-ken (JP)

( * ) Notice: Subject to any disclaimer, the term of this patent is extended or adjusted under 35 U.S.C. 154(b) by 153 days.

(21) Appl. No.: 15/064,693

(22) Filed: Mar. 9, 2016

(65) Prior Publication Data

US 2016/0277437 A1 Sep. 22, 2016

(30) Foreign Application Priority Data

Mar. 17, 2015 (JP) .................. 2015-052756

(51) Int. Cl.
| | |
|---|---|
| *H04L 9/32* | (2006.01) |
| *H04L 29/06* | (2006.01) |
| *G06F 21/73* | (2013.01) |
| *G09C 1/00* | (2006.01) |
| *G06F 21/44* | (2013.01) |

(Continued)

(52) U.S. Cl.
CPC .......... *H04L 63/1441* (2013.01); *G06F 21/44* (2013.01); *G06F 21/73* (2013.01); *G09C 1/00* (2013.01); *G11C 16/08* (2013.01); *G11C 16/10* (2013.01); *G11C 16/16* (2013.01); *G11C 16/26* (2013.01); *G11C 16/34* (2013.01); *H01L 21/02236* (2013.01); *H01L 23/528* (2013.01); *H04L 9/3278* (2013.01); *H04L 63/083* (2013.01); *H04L 65/1073* (2013.01); *G06F 2221/2129* (2013.01); *H01L 21/02255* (2013.01)

(58) Field of Classification Search
CPC .......... H04L 9/3278; H04L 9/32; G06F 21/44
See application file for complete search history.

(56) References Cited

U.S. PATENT DOCUMENTS

| | | | |
|---|---|---|---|
| 6,161,213 A | 12/2000 | Lofstrom | |
| 2010/0127822 A1* | 5/2010 | Devadas | ............... H04L 9/3278 340/5.8 |

(Continued)

FOREIGN PATENT DOCUMENTS

| | | |
|---|---|---|
| CN | 102523579 A | 6/2012 |
| EP | 2230793 A2 | 9/2010 |
| WO | WO0049538 A1 | 8/2000 |

OTHER PUBLICATIONS

G. Edward Suh, Srinivas Devadas, Physical Unclonable Functions for Device Authentication and Secret Key Generation, DAC '07 Proceedings of the 44th Annual Design Automation Conference, Jun. 4-8, 2007, 6 pages, ACM, San Diego, California, USA.

(Continued)

*Primary Examiner* — Izunna Okeke
(74) *Attorney, Agent, or Firm* — Alan D. Kamrath; Kamrath IP Lawfirm, P.A.

(57) ABSTRACT

A technology precluding attacks through peripheral devices thefts to a network of electronic appliance, by utilizing physical chip identification devices, is disclosed. The electronic appliance in the network are divided into the peripheral devices and stem servers managing registration information of the peripheral devices, wherein the stem servers serve as central control using software, and the peripheral devices are managed at device-level by having physical chip identification devices, thus the security of the whole network is efficiently reinforced.

4 Claims, 44 Drawing Sheets

(51) Int. Cl.
    *G11C 16/08*    (2006.01)
    *G11C 16/10*    (2006.01)
    *G11C 16/16*    (2006.01)
    *G11C 16/26*    (2006.01)
    *G11C 16/34*    (2006.01)
    *H01L 21/02*    (2006.01)
    *H01L 23/528*   (2006.01)

(56) References Cited

U.S. PATENT DOCUMENTS

2010/0257357 A1* 10/2010 McClain .............. G06F 21/43
                                                    713/155
2015/0101037 A1*  4/2015 Yang ................. G06F 21/44
                                                    726/16

OTHER PUBLICATIONS

Robert Aitken et al., Device and Technology Implications of the Internet of Things, Digest of Technical Papers—Symposium on VLSI Technology, Jun. 9-12, 2014, 4 pages, IEEE, USA.
Wikipedia, Mosfet, website, Feb. 22, 2015, 24 pages, internet.
Ellen Nakashima Stuxnet Malware is Blueprint for Computer Attacks on U.S., webpage, Oct. 2, 2010, 4 pages, www.washingtonpost.com.
Andy Greenberg, Why the Security of USB is Fundamentally Broken, webpage, Jul. 31, 2014, 7 pages, www.wired.com.

* cited by examiner

| Input Codes 42 | Registration Codes 43 |
|---|---|
| RTSDEDDTAG!$&D(() | oq&\|QX5'Xj*LS]e{ICY |
| OD$zD)X=Fpgd[_&x.*n | C(Y6;sHWLnp!L+5P[+@ |
| LJ/z5J@e$q9mhd0/9Mx | p;A18;6Nd[ic8a"+.SO |
| _p]Q\|9ecbe{2Ieq=!?E | wG;x'5@/O(GM";ODS+K |
| u+x~53cvmJfyvZ"Gzl# | Tw[F\sk8!a"hKIgFIN~ |

FIG. 20

NETWORK OF ELECTRONIC APPLIANCES AND A SEMICONDUCTOR DEVICE IN THE NETWORK

The application claims the benefit of Japan application serial No. 2015-052756, filed on Mar. 17, 2015, and the subject matter of which is incorporated herein by reference.

BACKGROUND OF THE INVENTION

1. Field of the Invention

The present disclosure generally relates to a method of physical chip identification and, more particularly, to a method of physical chip identification for chip-to-chip communications.

2. Description of the Related Art

The industry of information and communication technology has leaped forward after entered the 21st century, and has created even larger market in recent years. Not only informational terminal devices, all things such as household appliances, houses, automobiles, are connected to "Internet of Things (IoT)". IoT does not belong to any existing market. The even wider "Internet of Everything (IoE)" may even have the hidden possibility of changing the basis of the society lying inside.

Technically, it can be viewed as a chip-to-chip communicating technology within a smallest unit (node) connected to the network. It is different from the current network technology that the amount of the nodes may be up to trillions to tens of trillions (Trillion Nodes). For example, if the world population is seven billion, each person is surrounded by nodes at the amount of thousands. Those chips contain not only personal information, but also those systems controlling machines surrounding each person. Practically, it is impossible that everyone carefully and frequently manages those chips. Even under central control by well-trained experts, it is also impossible that there exists a computing resource which can handle trillions of nodes simultaneously. Even has it been developed, who should be in charge of the management system? It is inappropriate to have a single private enterprise to implement. Based on current situation, it is also inappropriate and impractical to have an artificial intelligence which is superior to a human being to handle that.

What may happen if we are unable to handle that? Imagine an auto-driving vehicle having high-volume Lithium-ion batteries being hacked, and it would be easy to understand. There could be a lot of auto-driving vehicles being remote controlled to move to targets (The White House, The U.S. Capitol, etc.) then being overcharged to cause big explosion. Similarly, imagine how dangerous it would be if someday an explosion happens in the garage of shopping center by remote-controlling those vehicles, two high-speed trains or bullet trains collide by manipulating the train control system, or a nuclear facility having atomic reactor or an air traffic control system is hacked.

It is too hasty to say that we will have no problem because the networks of such important facilities are insulated with strong firewall from the common internet, or are physically isolated. In fact, a nuclear facility in Iran have been severely attacked by a malware called "Stuxnet." (For example, Non-Patent Literature 1: http://www.washingtonpost.com/wp-dyn/content/article/2010/10/01/AR2010100106981.html).

There were several different versions of the attacking method of Stuxnet, the most believable one is attacking via mobile devices or USB storage devices. Once Stuxnet has been placed in the internet, it spends several months waiting for the opportunity to invade the targeted system. Even it is protected by a strong firewall, Stuxnet still can invade the USB storage devices or the mobile devices and wait until those devices are carried into inside the firewall and then the devices are connected to a terminal inside the firewall. Once connected, Stuxnet opens the backdoor and manipulates the PLC (programmable logic controller) of the centrifuge to start remote control it. By doing so, those one thousand centrifuges in the nuclear facilities in Iran are repeatedly accelerated and decelerated rapidly; and thus become damaged. While inside the physically isolated systems, Stuxnet attacks them by itself.

The damaged centrifuges in the nuclear facilities in Iran were insulated from the common network, but they had to be connected with the mobile devices of the manufacturer of those centrifuges at the periodical maintenance. If the centrifuges were connected with the common network, the centrifuges were not necessary to be connected with the mobile devices of the manufacturer. However, these connections were needed because the centrifuges were insulated. Furthermore, even if Stuxnet infects non-target hosts, it does nothing and hides. Thus, it is very difficult for any anti-virus software to detect it.

The Stuxnet attack is deemed to defer the nuclear research in Iran, and to prevent Israel from launching air strikes against Iran. However, what is dangerous is that the source code of Stuxnet has been stolen and leaked. There has been new malwares very similar to Stuxnet appeared since in 2014. (For example, Non-Patent Literature 2: http://www.wired.com/2014/07/usb-security/).

The virus which is called BadUSB manipulates the firmware of a USB device, instead of hacking into the PLC of an industrial equipment. A USB device is usually connected to another device, thus it usually has an identification mechanism for such a connection. The identification mechanism is built in the firmware. The firmware is stored in the controlling chip of the USB device and is used to control the program of the chip. BadUSB steals the identification from the firmware and does nothing to the equipment which the USB device is connected to. For example, BadUSB does not infect the personal computer, but it steals the IDs of the mouse and the keyboard used to control the computer. By doing so, the hacker who is on the other side of the earth can remote control other's computer. Because the virus does not infect the computer, it is then impossible for the anti-virus software to detect BadUSB.

The smallest communication unit (node) in IoT/IoE is the controlling chip of a machine. The controlling chip has controlling program (firmware) stored inside. The firmware has identification code for identifying each chip. The above mentioned new attacking method of remote controlling auto-driving vehicles can be done by stealing the identification code to remote control.

It may become possible for some hacker groups to conduct the synchronized terrorist attacks like the 9/11 in the future. This kind of new threats may not be eliminated by adopting the conventional counter-terrorism policy or conventional cyber security technologies.

SUMMARY OF THE INVENTION

The majority of cyber security technology is the central control by using a software. Since the understanding of cyber security technology is different from a person to another, it is impossible to expect every end-user to fulfil the operation management correctly. Even if there are a thousand of people fulfilling the operation management correctly, the security becomes vulnerable if there is one person fails to do so. Thus, the security of a system using a network should be subject to the central control managed by a well-trained supervisor with highly reliable software. Such a central control is the management adopting software via a network.

However, as mentioned above, the amount of nodes in a IoT/IoE business model is up to trillions, which makes the central control very difficult. Furthermore, once an identification code of nodes connected to a network is stolen, the whole system (such as an auto-driving vehicle or an air traffic control system) becomes weak. The using of identification codes is because that the networks are under control of software. This is the substantial limit of security adopting central control.

It is therefore the objective of this disclosure to provide a method of local identification management of nodes using semiconductor devices.

In order to solve the problem mentioned above, a chip identification device using a chip identification method, comprises an assembly of nonvolatile memory cells disposed at intersections of a plurality of bit lines and a plurality of word lines, output codes formed by combining each input code selecting at least one word line and each data assembly read by each bit line which is corresponding to each selected word line, wherein the input codes are arranged by row numbers of the selected word lines in order, wherein the output codes are formed by combining the data arranged in rows according to column numbers of the nonvolatile memory cells in response to the selected word lines in order by the input codes, with the data arranged by the row numbers of the word lines selected in order by the input codes, the chip identification device comprises the function of deleting the data corresponded to an address from the output code if found consistent comparing the address corresponded to the word line selected by the input code and the address recorded in a buffer, wherein the address recorded in the buffer is corresponded to the nonvolatile memory cell which belongs to a peak in a threshold voltage distribution read after a batch erase and a batch writing of the nonvolatile memory cell.

In addition, the manufacturing method of the chip identification device of this disclosure comprises a step of doping donor ions and doping acceptor ions between a well step and a polycrystalline silicon step, or comprises a step of thermal oxidation slimming a comb-shaped structure formed on a semiconductor substrate, between a step of forming the comb-shaped structure on the semiconductor substrate and a step of forming a dielectric film.

According to this disclosure, a novel chip identification method is provided to reduce the risk that an identification code will be stolen to control the chip.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein:

FIG. 20 is a diagrammatic view of a corresponding table of input codes and registration codes.

DETAILED DESCRIPTION OF THE INVENTION

Figure 1:
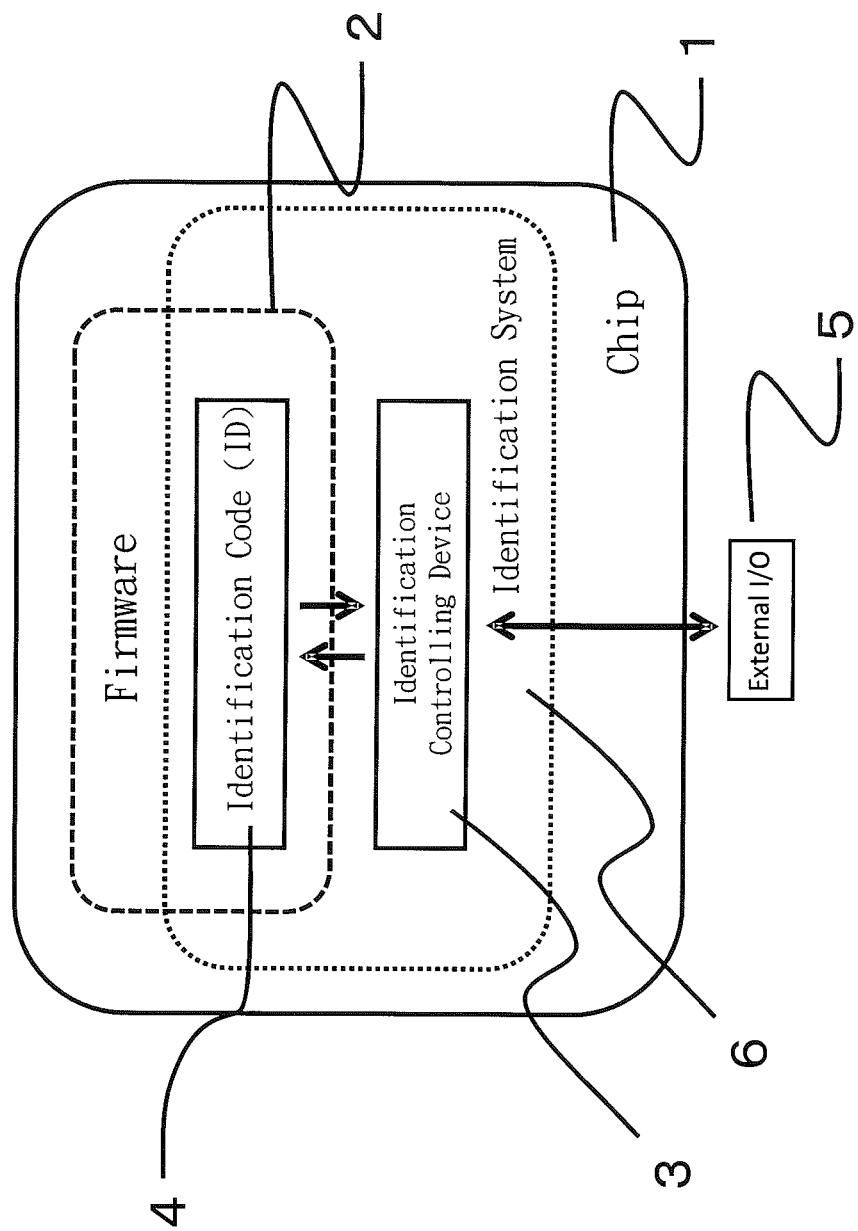
FIG. 1 is a diagrammatic view of a chip embedded with conventional identification system.

FIG. 1 shows a conventional and typical chip controlling system. An identification controlling device 3, which realizes the functions of the chip, may read an identification code (ID) 4, which may be comprised in firmware 2, when needed. For instance, for the chip 1, the identification controlling device 3 may refer to the identification code (ID) 4 according to the external input, and may assert that the chip 1 is a certificated external device. However, this is only an assertion instead of proving it to be truly certificated. According to the above reason, one may steal the identification code (ID) 4, and then other chips may be used to replace the chip 1.

Figure 2:
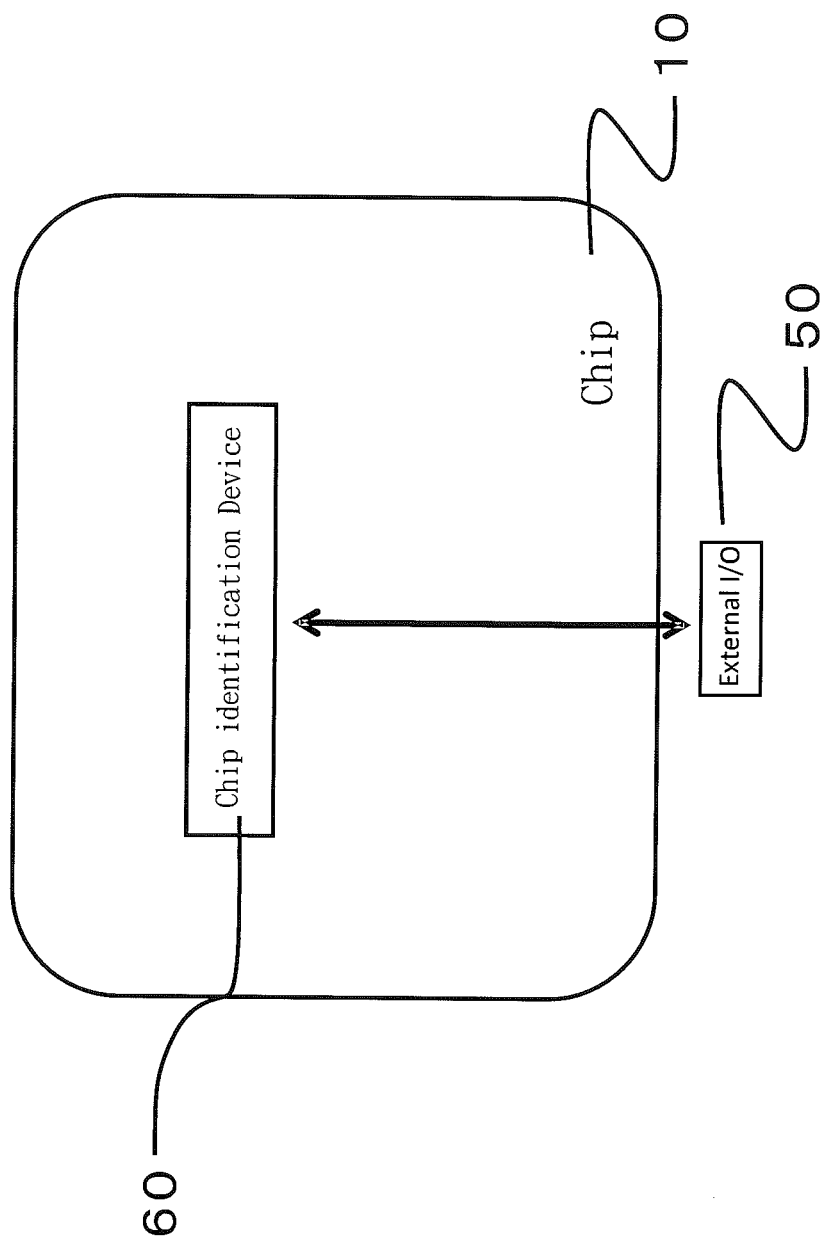
FIG. 2 is a diagrammatic view of a chip embedded with a chip identification device of the disclosure.
Figure 3:
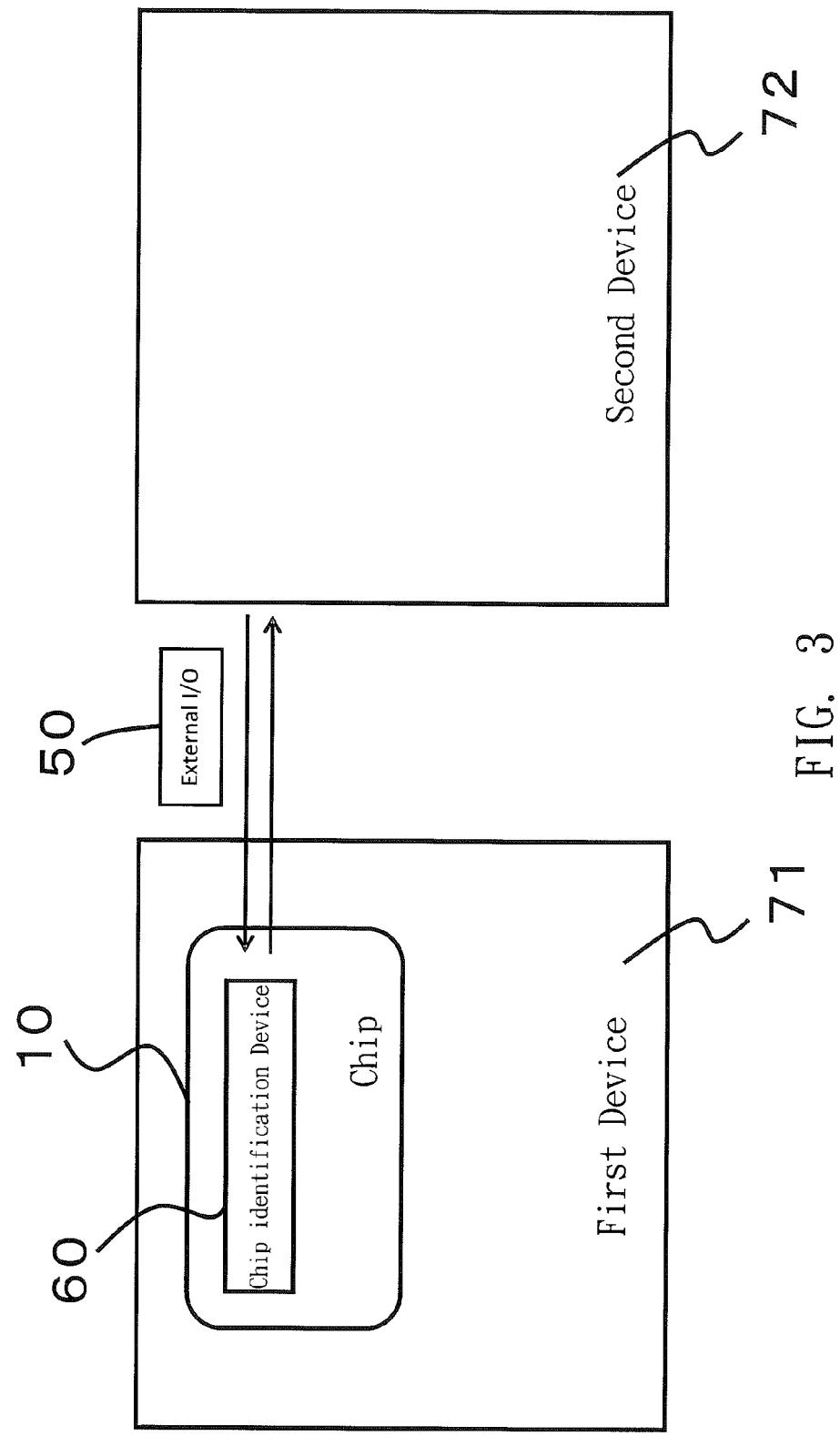
FIG. 3 shows a connecting method of a device comprising the chip embedded with the chip identification device of the disclosure.

As presented in FIG. 2, this disclosure substitutes a chip identification device 60 for an identification system 6 formed with the identification code (ID) 4 and the identification controlling device 3. The chip identification device 60 may generate output signals corresponding to each call (input signal) received from an external I/O 50. The output signals may be generated based on physical randomness. Furthermore, there may exist a property that the output signal changes corresponding to the change made on the input signal. Referring to FIG. 3, consider a first device 71 connected to a second device 72 via network, wherein the first device 71 has the chip 10 embedded with the chip identification device 60.

Figure 4:
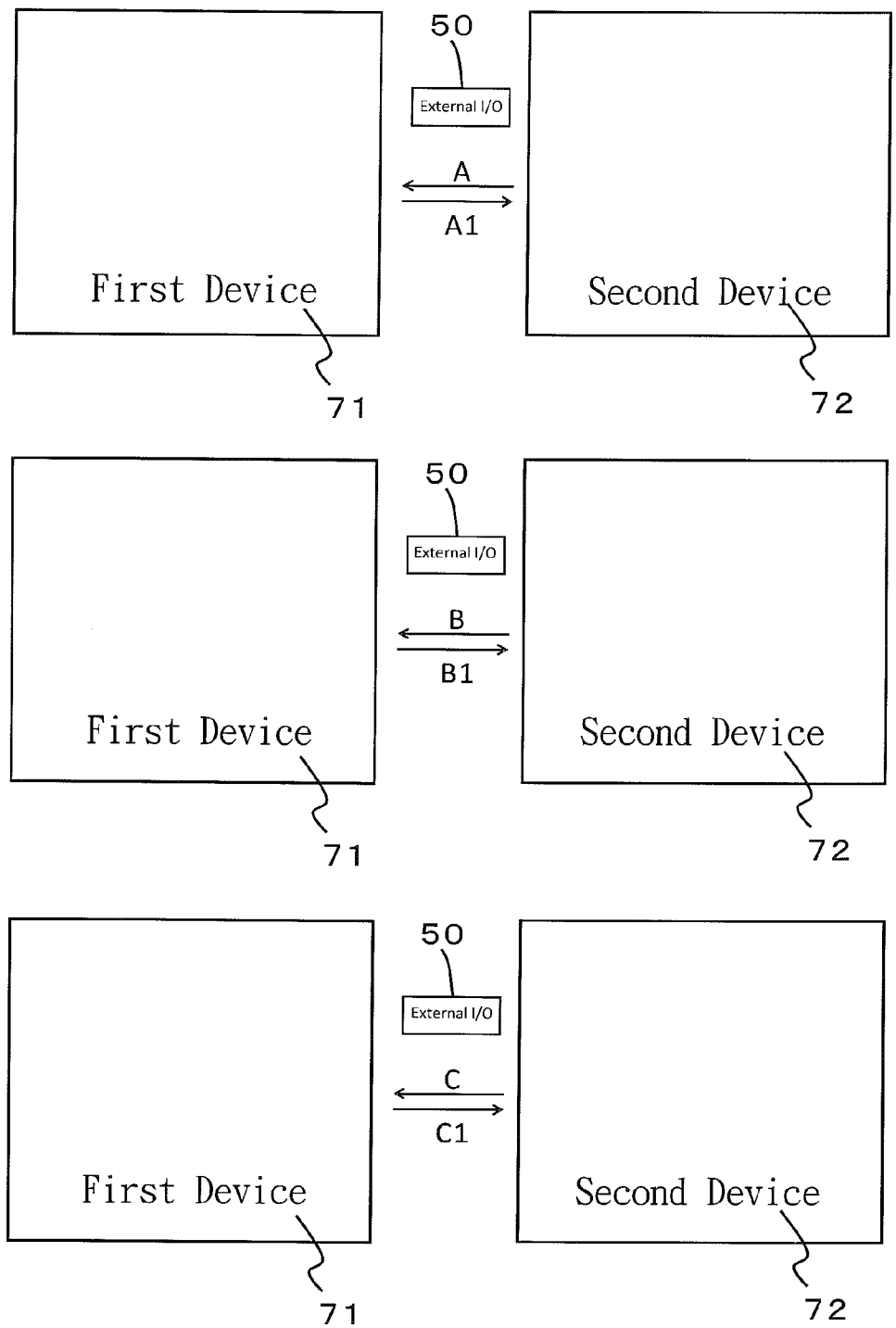
FIG. 4 shows the transmission of signals through external I/O.

Referring to FIG. 4, the second device 72 may send signal A, signal B, signal C, . . . , as input signals via the network to the chip identification device 60 embedded in the first device 71, to identify the first device 71, which may be connected to the network. The chip identification device 60 may return signal A1, signal B1, signal C1, . . . , respectively, as output signals via the network to the second device 72. Here, the second device 72 may regard the first device 71 as a device "returning output signal A1 in reply to input signal A; returning output signal B1 in reply to input signal B; and returning output signal C1 in reply to input signal C; . . . " It may be expressed as a communication series (A, B, C, . . . : A1, B1, C1, . . . ). Alternatively, the second device 72 may regard the first device 71 as a device "returning output signal F1 in reply to input signal F; returning output signal A1 in reply to input signal A; and returning output signal K1 in reply to input signal K; . . . " It may be expressed as a communication series (F, A, K, . . . : F1, A1, K1, . . . ). However, this communication does not need to be done to all possible input signals. The input signals may have infinite patterns, thus no specific result may be generated when conducting all the communication on a specific device. On the contrary, the infinite patterns of the input signals may make the number of devices that may be connected to the second device 72 via network unlimitedly. In other words, when first connecting the first device 71 to the second device 72 via network, the second device 72 may register the first device 71. The registration may preferably be done by a certificated user of the second device 72 or a person being transferred the authority appropriately from a certificated user of the second device 72. When registering, randomly chosen input signals 102, such as (R, L, A) and the output signals (R1, L1, A1) may be stored in the internal memory 302 of the second device 72. At this time, the communication series of the registration may be (R, L, A: R1, L1, A1). More particularly, the number of the devices which may be connected to the second device 72 may be infinite, so the set of input signals 102 may preferably be predetermined in advance. In this event, the communication series (R, L, A: R1, L1, A1) registered on the first device 71 may be replaced with (R1, L1, A1) as a registration code 103. The example in FIG. 5 explains that the first device 71, a fourth device 74, a fifth device 75, . . . registering to the second device 72. For example, the fourth device 74 may return to the second device 72 output signals (R4, L4, A4) in reply to input signals (R, L, A). The fifth device 75 may return to the second device 72 output signals (R5, L5, A5) in reply to input signals (R, L, A).

Figure 6:
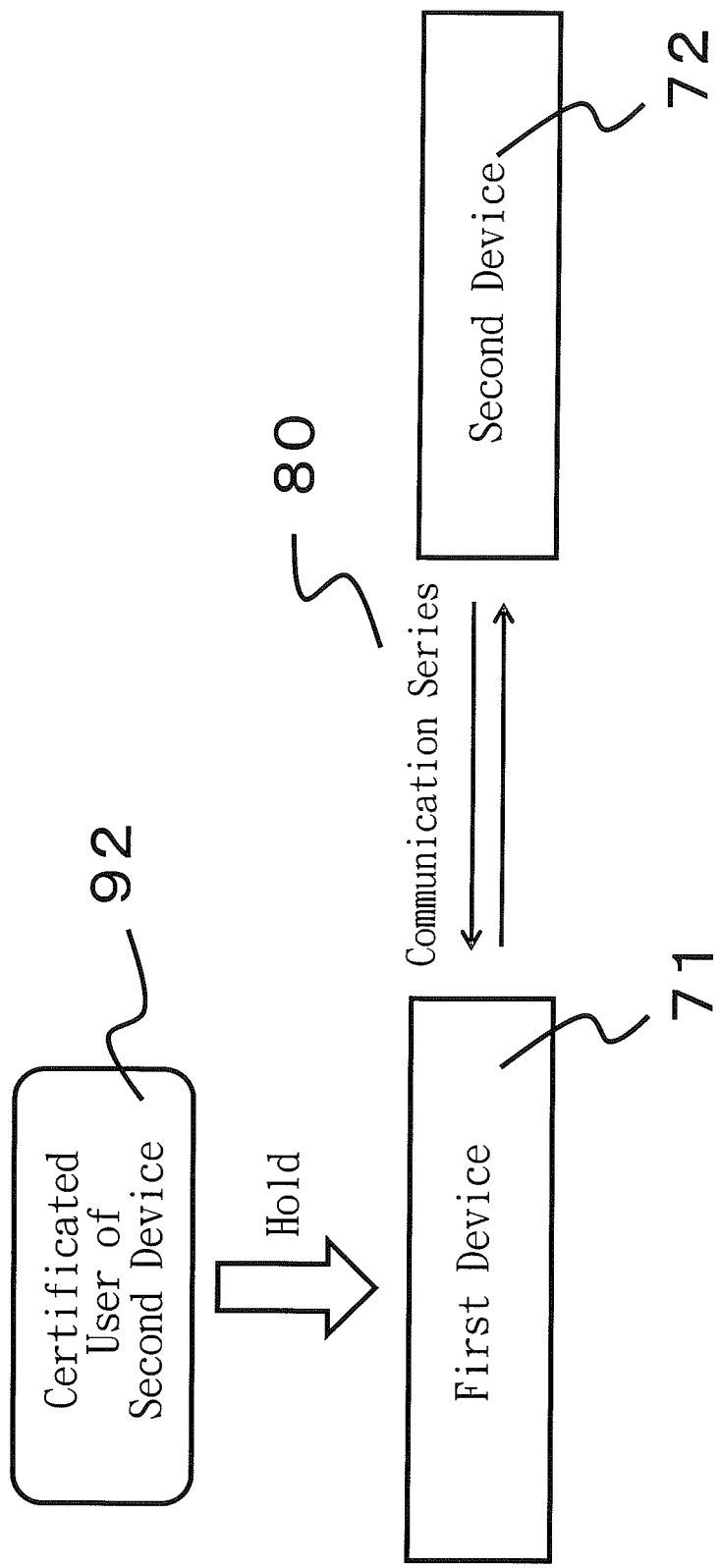
FIG. 6 shows a method of a certificated user using the device comprising the chip embedded with the chip identification device of the disclosure in a network.

Referring to FIG. 6, it presents an example that a certificated user 92 uses the first device 71 that he holds to operate the second device 72 via network. The first device 71 and the second device 72 may use the communication series 80 to communicate via network, and may conduct together the task that the certificated user 92 intends to do on the second device 72. Here, the certificated user 92 of the second device 72 may not make a commitment to the communication series 80. If it may make a commitment, the method of management and operation of the second device 72 may become complex, and may thus degrade the convenience of IoT/IoE. Particularly, when the second device 72 connects via network to an external device, the second device may first send input signals 102 (R, L, A) to the external device, and may confirm that whether the signals returned from the external device match with any registration code 202 (R1, L1, A1), (R4, L4, A4), (R5, L5, A5), . . . .

Figure 7:
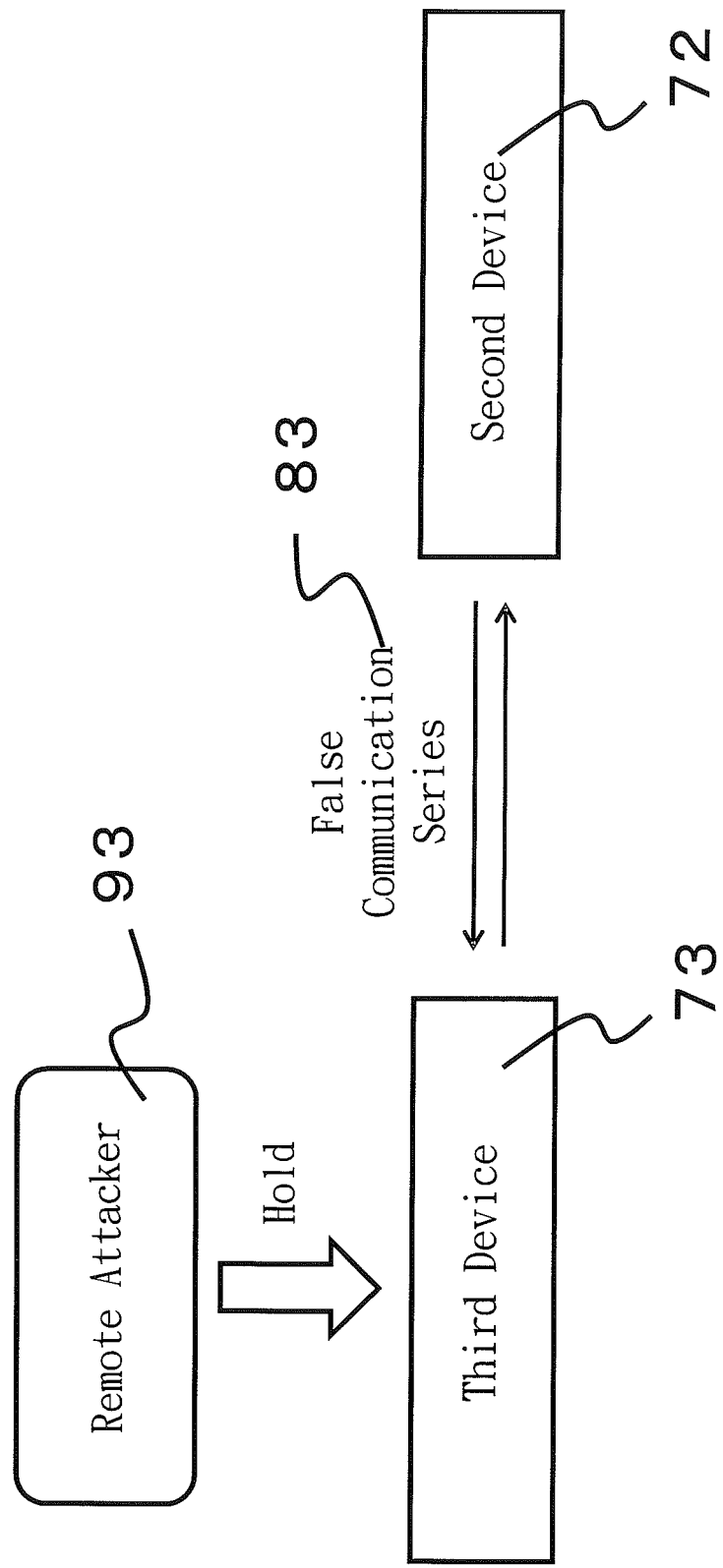
FIG. 7 shows a method of a remote attacker inappropriately connecting to the network.

Let us consider the situation shown in FIG. 7, where a remote attacker 93 inappropriately replaces the first device 71 with a third device 73, which may be held by the remote attacker 93. The third device 73 may have to completely imitate the communication series 80 without using the chip identification device 60 embedded in the first device 71. It may be enough to consider whether this is possible or not. If it may be impossible, it may be ascertained that the chip identification method presented in the disclosure may prevent a device from being stolen. The prerequisite may be that the one who is trying to inappropriately replace the first device 71 with the third device 73 (the remote attacker 93) may not really acquire the first device 71. This may be the natural condition in IoT/IoE. In other words, the theft in IoT/IoE may be based on remote operation. The purpose of the remote attacker 93 may be to remote control the second device 72 with the third device 73, which may be in his possession. In order to steal the first device 71, the remote attacker 93 may have to go to the place storing the first device 71, which appropriately connected to the second device 72, and steal it secretly. It means that the attack may not be done via the network. In other words, the remote attacker 93 may not complete the remote control without being noticed by the user of the second device 72. When the third device 73 and the second device 72 are connected together via the network, the second device may send input signals (R, L, A, . . . ) via the network to the third device 73 to identify the third device 73 via the network connection. The third device 73 may return to the second device 72 output signals (R3, L3, A3, . . . ) via the network. Accordingly, a false communication series 83 (R, L, A, . . . : R3, L3, A3, . . . ) may be generated. Namely, the remote attacker 93 may have to make the false communication series 83 identical to the true communication series 80. Here, the communication series (R, L, A: R3, L3, A3), which may be formed with the input codes 102 (R, L, A) and the response (R3, L3, A3) to the input, may be an example of the false communication series 83. If (R3, L3, A3) may be identical to (R1, L1, A1), the remote attacker 93 may replace the first device 71 with the third device 73 and may complete the remote attack. As in the example shown in FIG. 5, the remote attacker 93 may only have to make (R3, L3, A3) identical to anyone of the registration codes 202 stored in the internal memory 302 of the second device 72.

Thus, it may be understandable that there are basically two methods of conducting a remote attack. The first may be to steal the input codes 102 and at least one of the registration codes 202 stored in the internal memory 302 of the second device 72. For instance, if the remote attacker 93 may successfully steal (R4, L4, A4) from the registration codes 202, the remote attacker 93 may substitute the fourth device 74 for the third device 73, which may be in his possession, and may inappropriately remote control the second device 72. Similarly, if the remote attacker 93 may successfully steal (R1, L1, A1) from the registration codes 202, the remote attacker 93 may substitute the first device 71 for the third device 73, which may be in his possession, and may inappropriately remote control the second device 72. In order to prevent the system from being remote attacked as described, the supervisor of the system may have to strictly protect the internal memory 302 of the second device 72. Therefore, the devices comprising internal memories where the input codes 102 or registration codes 202 may be stored, such as the second device 72, may be preferably strictly protected by well-trained experts using the always most advanced security software technology. By doing so, if the second device 72 may be mounted in the center of the network as the stem, and may serve as or be under the central control of the security supervisor, the first method of remote attacking may be almost precluded. However, if the number of the devices connected to the network is up to trillions, it may be practically impossible to strictly protect all devices as the second device 72. This may also be the limit of the central control. Here, the remote attacker 93 may conduct the remote attacks on devices connected to the second device 72, but not reached by the central control, such as the first device 71, the fourth device 74, the fifth device 75, . . . in the example in FIG. 5. This may be the second method of remote attacking. However, the first device 71 may not have stored the pairs (communication series), which may be formed by the input codes 102 and the registration codes 202, as identification codes in its internal memory. The similar may be applied to the other external devices connected to the second device 72 via network, such as the fourth device 74, the fifth device 75, etc. Those external devices (the first device 71, the fourth device 74, the fifth device 75, etc. in the example in FIG. 5) may be individually embedded with chips having different chip identification device.

Figure 8:
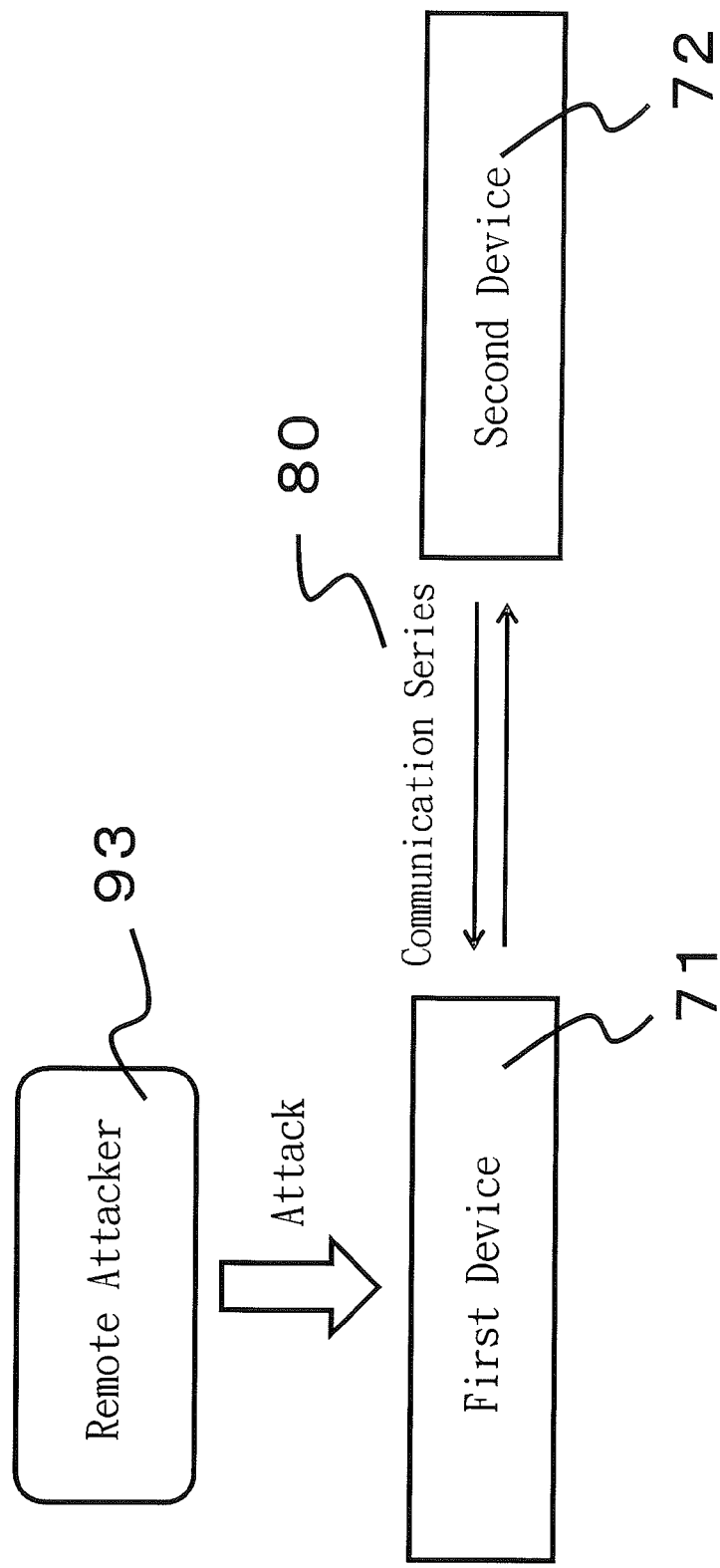
FIG. 8 shows a method of a remote attacker attacking the certificated device.

Let us consider the situation shown in FIG. 8, where the remote attacker 93 remote attacks the first device 71. First, the remote attacker 93 may inappropriately access the internal memory of the first device 71, in order to steal the information (communication series) regarding the registration codes 202 and the input codes 102. However, this attack may necessarily fail, because the first device 71 may not store such information in its internal memory. Then, the remote attacker 93 may send randomly chosen signal (X, Y, Z) to the first device 71, and may obtain a response (X1, Y1, Z1). When (X, Y, Z) may be different from the input code 102 (R, L, A), the response (X1, Y1, Z1) may also be different from (R1, L1, A1) of the registration codes 202. Thus the second remote attack may also fail necessarily. Here, the problem may be that the signal set (X, Y, Z) randomly chosen by the remote attacker 93 may accidentally match with the input code 102 (R, L, A) stored in the internal memory 302 of the second device 72. In order to prevent such an accident, the number of the elements of the input codes 102 may have to be great, and may not be disclosed to personnel other than the supervisors of the second device 72. The information may have to be strictly protected by the supervisor of the second device 72. In addition, the information may preferably be changed occasionally. When conducting the change, re-registrations may have to be conducted on devices connected to the second device 72. In order to reduce the frequency of such re-registrations, the number of elements of the input codes 102 may have to be managed to be great as possible. Thus, the input codes 102 may act as passcodes.

The passcodes may preferably be commonly used to check the IDs of the various peripheral devices. In this event, individual input codes may not be needed to access each peripheral device. Thus, the input codes described above in the disclosure may be called the "common passcode" hereinafter.

The situation described above, wherein the second device 72 may be a computer (such as a personal computer), and the first device 71, the fourth device 74, and the fifth device 75 connected thereto may be peripheral devices connected to the computer to use. For instance, may be a mouse, a keyboard, a microphone, etc. As described above, there may be a prerequisite that the computer substance is protected by the latest version of the anti-virus software and is managed by a supervisor. One of the objectives of the disclosure may be to preclude the thefts of the peripheral devices (mouse, keyboard, microphone, etc.) to protect the computer substance. By doing so, the remote attacks on the peripheral devices may thus be prevented, while the purpose of the anti-virus software may be protecting the computer substance and it may not be able to protect the peripheral devices.

Figure 9:
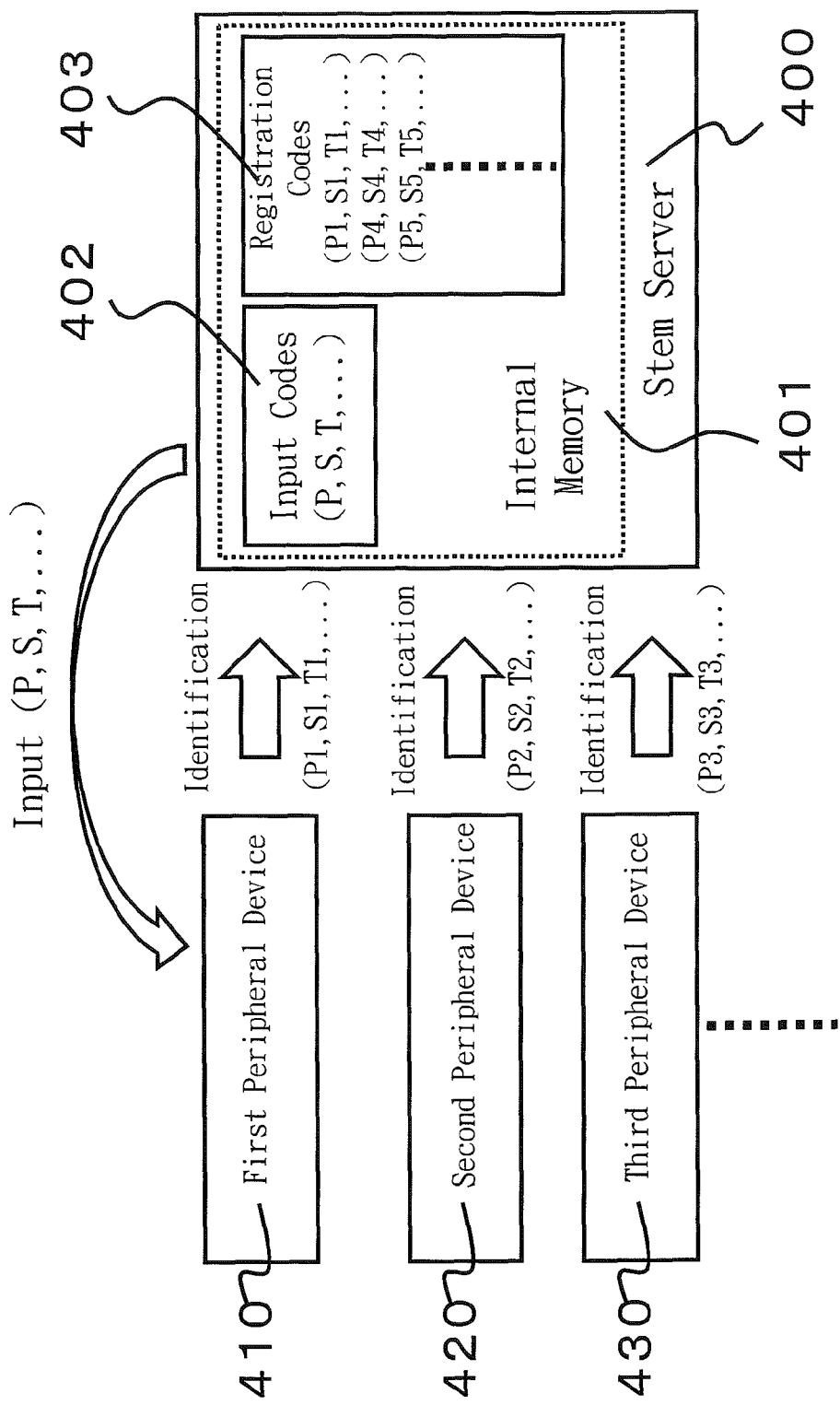
FIG. 9 is a diagrammatic view of a method of connecting peripheral devices comprising the chips embedded with chip identification devices of the disclosure to a stem server.

In the case that the second device 72 may be used as the stem server providing the core functions of network services, the first device 71, the fourth device 74, the fifth device 75, . . . are connected thereto, may be viewed as peripheral devices with regards to the stem server. FIG. 9 presents an example that a first peripheral device 410, a second peripheral device 420, a third peripheral device 430, . . . are connected to a stem server 400 via network. For instance, the first peripheral device 410, the second peripheral device 420, the third peripheral device 430, . . . may be terminal devices, which may be using the network service, of end-users. For example, it may be a smartphone, a tablet, a computer terminal, a remote controller of a smart household appliance, a control panel of auto-driving vehicle, or other wearable devices. As described above, the prerequisite may be that the stem server is managed by well-trained experts using the latest security technology. One of the objectives of the disclosure may be to preclude the substitutions (thefts) of the terminal devices (smartphone, tablet, computer terminal, or other wearable devices) of end-users, in order to prevent the stem server from inappropriately access. Therefore, the infinite number of informational terminal devices, which may not be sufficiently protected by well-trained experts even because of too large number even though using the latest security software, may be prevented from remote attack.

In the case that the second device 72 may be used as the data center providing the core functions of cloud sensing services, the first device 71, the fourth device 74, the fifth device 75, . . . are connected thereto, may act as sensors gathering the data needed by the data center. The number of the sensors may be very huge as infinite, and may be disposed in a vast territory. Thus, it may be practically impossible to protect the entirety of the sensors from remote attack with the central control. Such sensors may be a GPS, a virus monitor, a thermometer, a seismometer, a LED socket-type visible light communication device, a biosensor, and various smart sensors. As described above, the prerequisite may be that the data center is managed by well-trained experts using the latest security software. One of the objectives of the disclosure may be to preclude the substitutions (thefts) of the sensors, in order to prevent the data center from inappropriately access. Therefore, the entire of the sensors in the cloud sensing network, which may not be sufficiently protected by well-trained experts even though using the latest security software, may be prevented from remote attack.

One of the features of the disclosure may be that the peripheral devices (such as the first peripheral device 410, the second peripheral device 420, the third peripheral device 430, . . . ), which may not be reached by the central control, may not have stored input data such as the common passcode. Thus, it may also be one of the features that, the "stem server" saving necessary data (such as the common passcode) for identification communication and the "peripheral devices" without such data stored, may be separated. Furthermore, it may further be one of the features that the "stem server" saving necessary data (such as the common passcode) for identification communication may conduct the central control, while the "peripheral devices" out of the central control may adopt the chip identification method of the disclosure.

Figure 10:
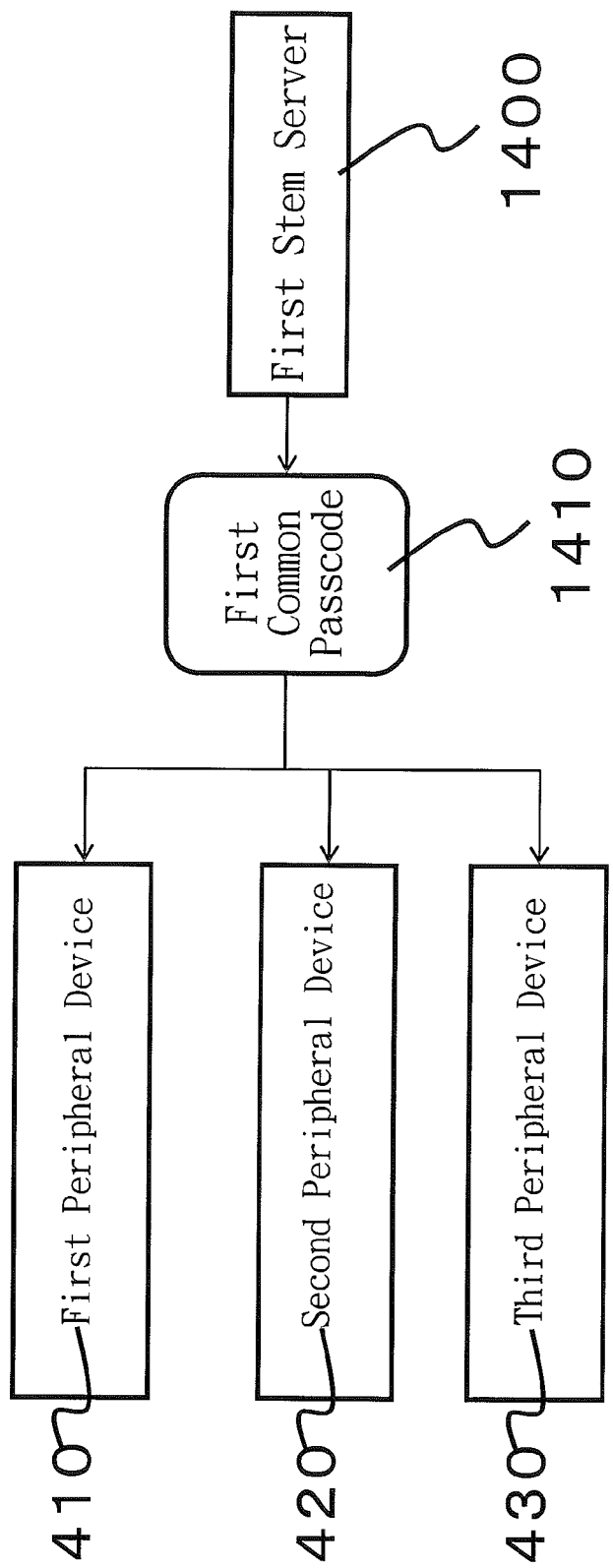
FIG. 10 is a diagrammatic view of a method of the stem server sending a common passcode to the peripheral devices comprising the chips embedded with chip identification devices of the disclosure.
Figure 11:
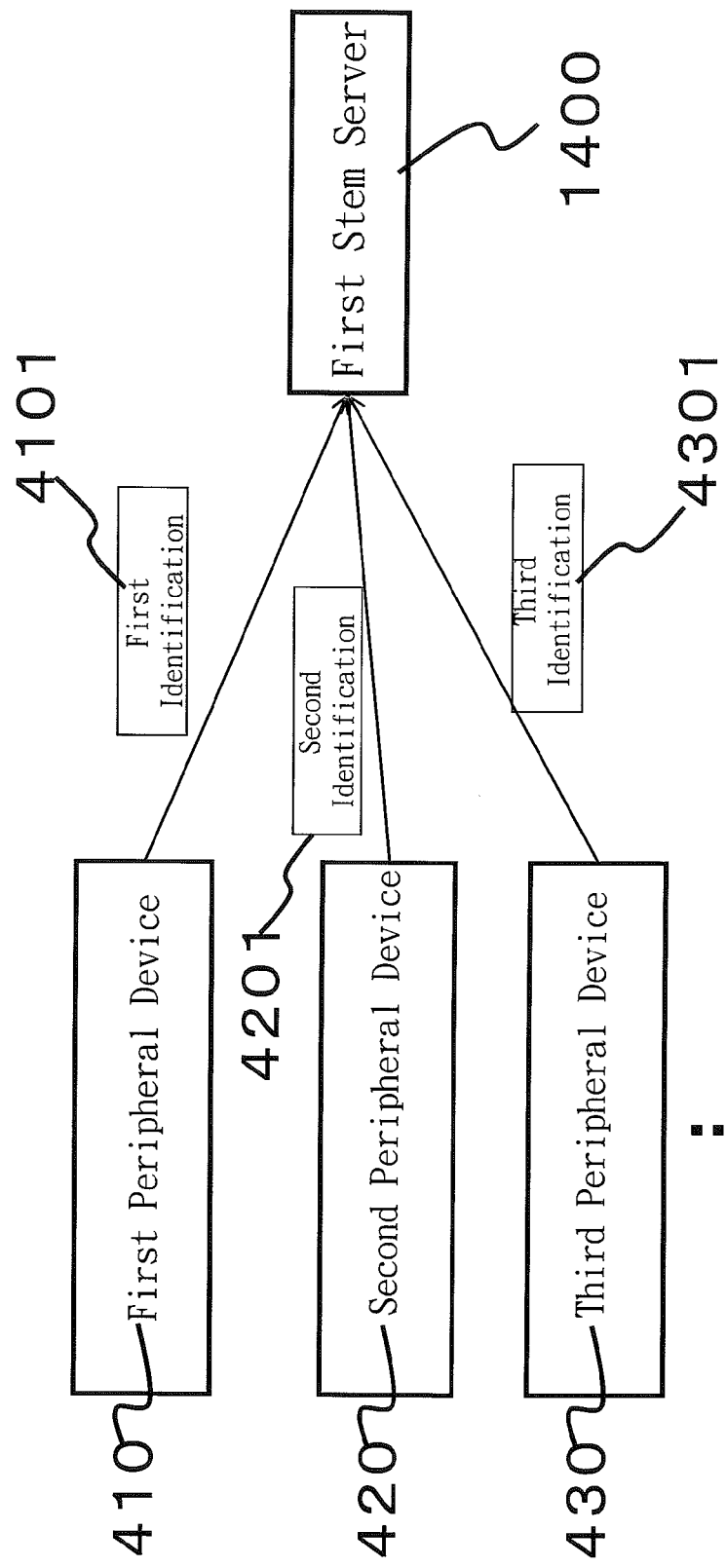
FIG. 11 is a diagrammatic view of a method of the peripheral devices comprising the chips embedded with chip identification devices of the disclosure sending identification codes to the stem server.
Figure 12:
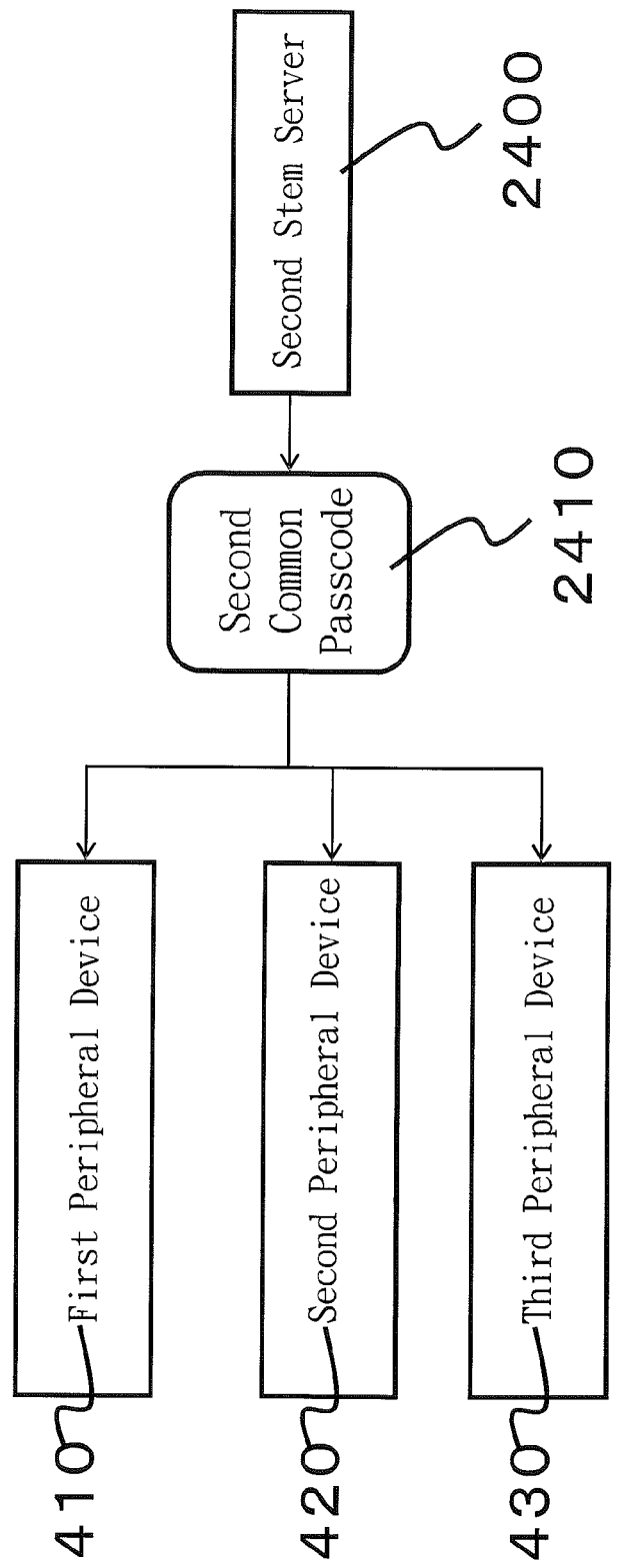
FIG. 12 is a diagrammatic view of a method of the stem server sending a common passcode to the peripheral devices comprising the chips embedded with chip identification devices of the disclosure.
Figure 13:
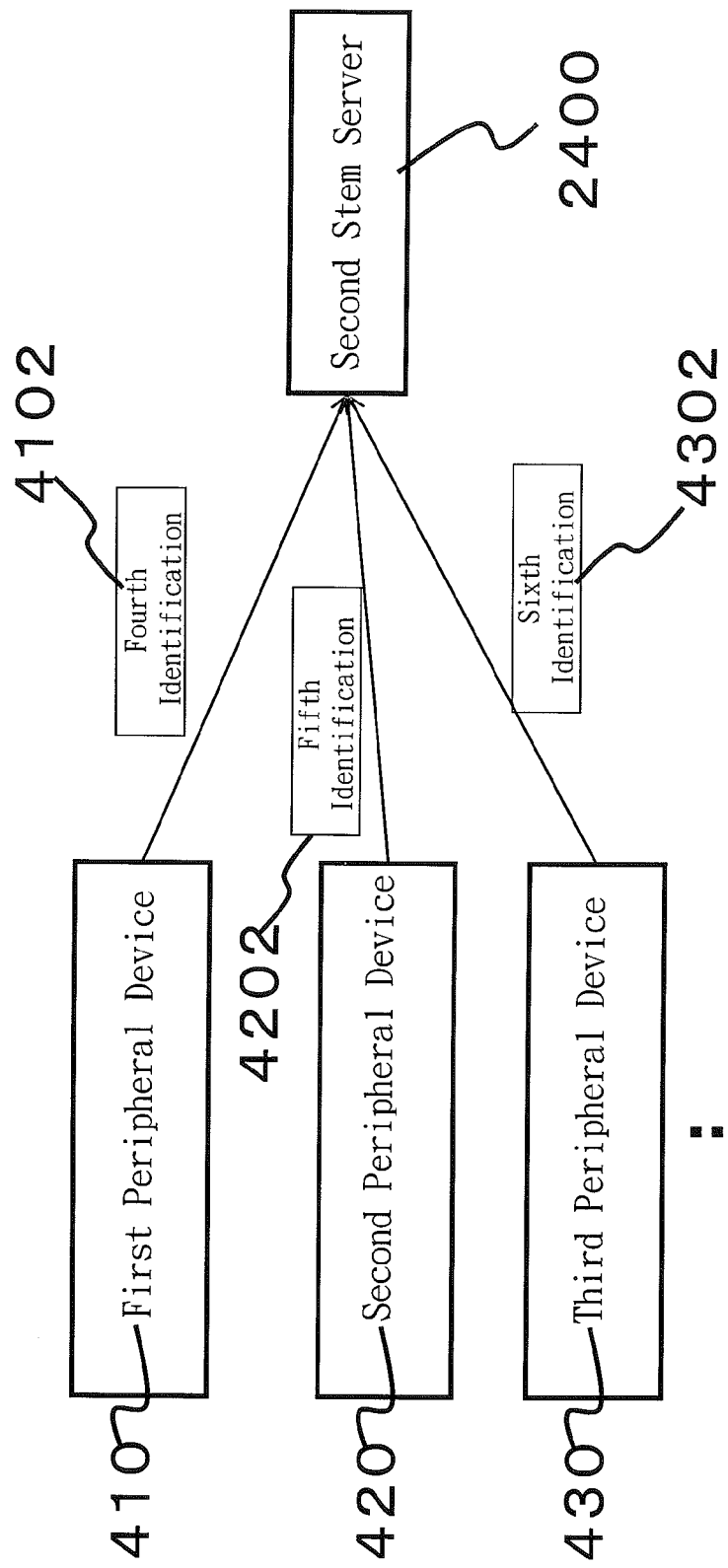
FIG. 13 is a diagrammatic view of a method of the peripheral devices comprising the chips embedded with chip identification devices of the disclosure sending identification codes to the stem server.

At least one of the common passcode may be stored in a first stem server 1400, and may be sent to the peripheral devices to identify the peripheral devices. For instance, as shown in FIG. 10, the first stem server 1400 may send a first common passcode 1410 to a first peripheral device 410, a second peripheral device 420, and a third peripheral device 430. The peripheral devices may identify the first stem server 1400 as "the one who sends the first common passcode 1410." As shown in FIG. 11, the first peripheral device 410, the second peripheral device 420, and the third peripheral device 430, may respond to the input of the first common passcode 1410; and then returning to the first stem server 1400 with a first identification 4101, a second identification 4201, and a third identification 4301, respectively. The first stem server 1400 may identify the first peripheral device 410, the second peripheral device 420, and the third peripheral device 430 as "those who return the first identification 4101, the second identification 4201, and the third identification 4301, in responding to the first common passcode 1410", respectively. Similarly, as shown in FIG. 12, a second stem server 2400 may send a second common passcode 2410 to the first peripheral device 410, the second peripheral device 420, and the third peripheral device 430. The peripheral devices may identify the second stem server 2400 as "the one who sends the second common passcode 2410." As shown in FIG. 13, the first peripheral device 410, the second peripheral device 420, and the third peripheral device 430, may respond to the input of the second common passcode 2410; then returning to the second stem server 2400 with a fourth identification 4102, a fifth identification 4202, and a sixth identification 4302, respectively. The second stem server 2400 may identify the first peripheral device 410, the second peripheral device 420, and the third peripheral device 430 as "those who return the fourth identification 4102, the fifth identification 4202, and the sixth identification 4302, in responding to the second common passcode 2410", respectively. Surely, any two of the first identification 4101, the second identification 4201, the third identification 4301, the fourth identification 4102, the fifth identification 4202, and the sixth identification 4302, are different.

Figure 14:
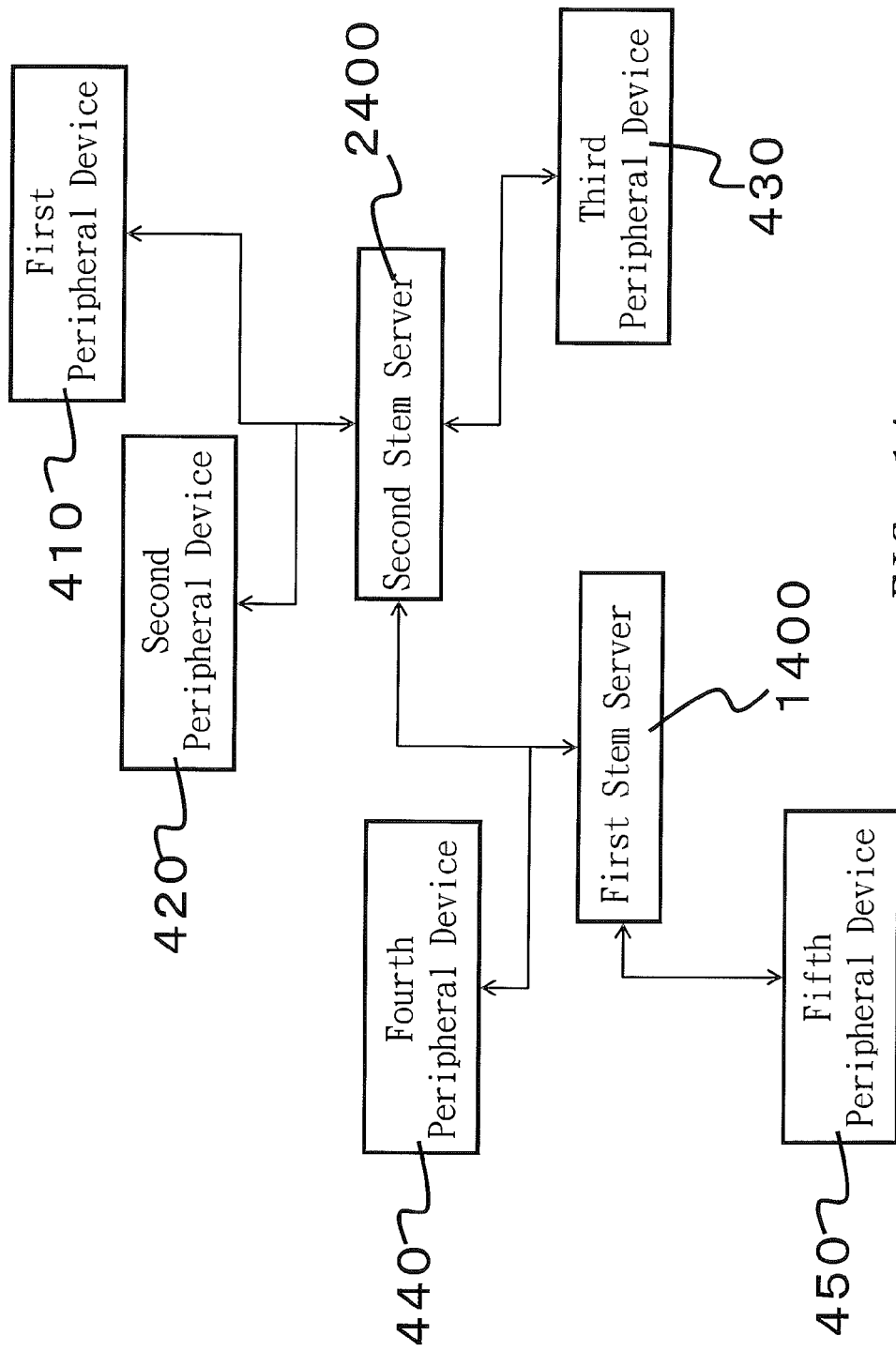
FIG. 14 is a diagrammatic view of a network formed with a plurality of stem servers and a plurality of peripheral devices comprising chips with chip identification devices of the disclosure.

In a real world network, the numbers of the peripheral devices and the stem servers may be limitlessly large. For example, FIG. 14 shows a network is constituted of two stem servers (the first stem server 1400 and the second stem server 2400) and five peripheral devices (the first peripheral device 410, the second peripheral device 420, the third peripheral device 430, a fourth peripheral device 440, and a fifth peripheral device 450). The first stem server 1400, the fourth peripheral device 440, and the fifth peripheral device 450 may constitute a network unit, where the first stem server 1400 serves as the central control. The second stem server 2400, the first peripheral device 410, the second peripheral device 420, and the third peripheral device 430 may constitute another network unit similarly. The first stem server 1400 and the second stem server 2400 may be connected to each other. Moreover, the fourth peripheral device 440 and the fifth peripheral device 450 may be connected to the first stem server 1400 and not to the second stem server 2400; while the first peripheral device 410, the second peripheral device 420, and the third peripheral device 430 may be connected to the second stem server 2400 and not to the first stem server 1400. One of the features of the disclosure may be to provide such kind of networks that comprises a plurality of the stem servers and a plurality of the peripheral devices, wherein the stem servers may communicate with another stem severs directly, but the peripheral devices may not communicate with other peripheral devices directly. The reason may lie in the fact that the peripheral devices unreached by the central control may not have stored with input data, such as the common passcode. On the other hand, the peripheral devices may communicate with other peripheral devices indirectly through the stem servers. For instance, the first peripheral device 410 may communicate with the second peripheral device 420 indirectly through the second stem server 2400. The fourth peripheral device 440 may communicate with the fifth peripheral device 450 indirectly through the first stem server 1400. The third peripheral device 430 may communicate with the fourth peripheral device 440 indirectly through the first stem server 1400 and the second stem server 2400 connected via network. Thus, the resources for central control may be concentrated to the stem servers only. The practical example for FIG. 14 may be an auto-driving vehicle and a smart house. For instance, the network unit constituted of the first stem server 1400, the fourth peripheral device 440, and the fifth peripheral device 450 may be a component of an auto-driving vehicle. At the same time, the network unit constituted of the second stem server 2400, the first peripheral device 410, the second peripheral device 420, and the third peripheral device 430 may be a component of a smart house. The battery of the auto-driving vehicle may charge the battery of the smart house when a disaster happens. For example, the auto-driving vehicle may have a sensor (such as the fourth peripheral device 440) monitoring the condition of the battery of the smart house. That is, the fourth peripheral device 440 may be connected via network to both of the first stem server 1400 and the second stem server 2400.

Figure 15:
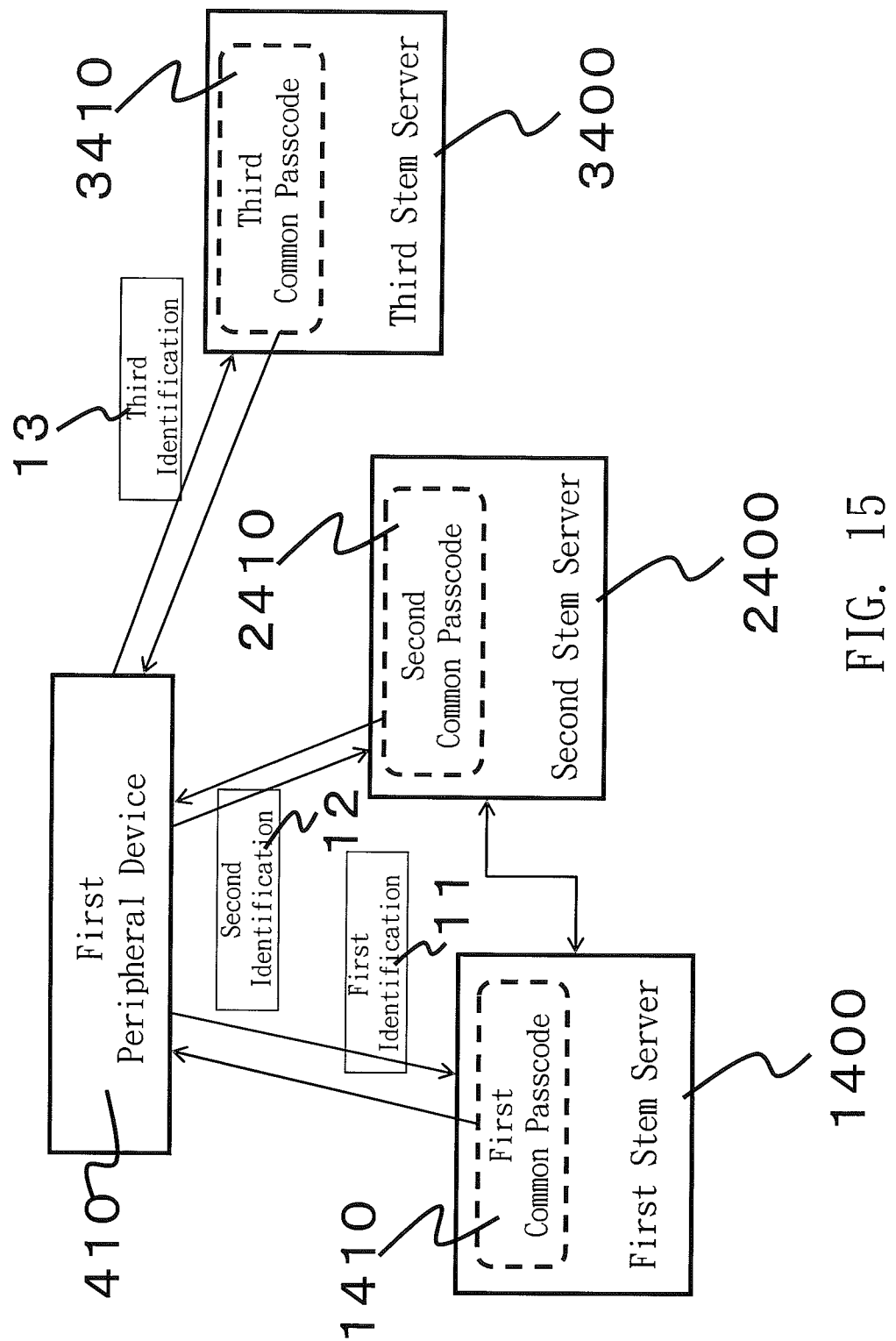
FIG. 15 is a diagrammatic view of a plurality of stem servers connected to a peripheral device.

Referring to FIG. 15, in a network adopting the disclosure, a peripheral device (such as the first peripheral device 410) may be connected to a plurality of the stem servers (such as the first stem server 1400, the second stem server 2400, and a third stem server 3400). For example, in this event, the first stem server 1400 may communicate with the second stem server 2400 directly, while neither the first stem server 1400 nor the second stem server 2400 may communicate with the third stem server 3400 directly. It may not have been proved yet here that the third stem server 3400 may not be a remote attacker. Thus, it may be important that the first peripheral device 410 may not have stored with the data regarding the communication identification (the common passcodes). This problem may be solved by using the chip identification method of the disclosure.

The first stem server 1400 may have the first common passcode 1410, the second stem server 2400 may have the second common passcode 2410, and the third stem server 3400 may have a third common passcode 3410. In other words, the first peripheral device 410 may identify the first stem server 1400 as "the one inputs the first common passcode 1410 thereto", the second stem server 2400 as "the one inputs to him the second common passcode 2410 thereto", and the third stem server 3400 as "the one inputs to him the third common passcode 3410 thereto." In responding to the inputs, the first stem server 1400 may identify the first peripheral device 410 as "the one returns with a first identification 11", the second stem server 2400 may identify the first peripheral device 410 as "the one returns with a second identification 12", and the third stem server 3400 may identify the first peripheral device 410 as "the one returns with a third identification 13." Here, the data regarding the communication identification (the common passcodes or the returned identification data in responding to the common passcodes) may be stored in the stem servers, but may not be stored in the peripheral devices. The peripheral devices may have the chip identification device of the disclosure.

Next, the requirements that may have to be satisfied in the chip identification method of the disclosure will be discussed.

Figure 16:
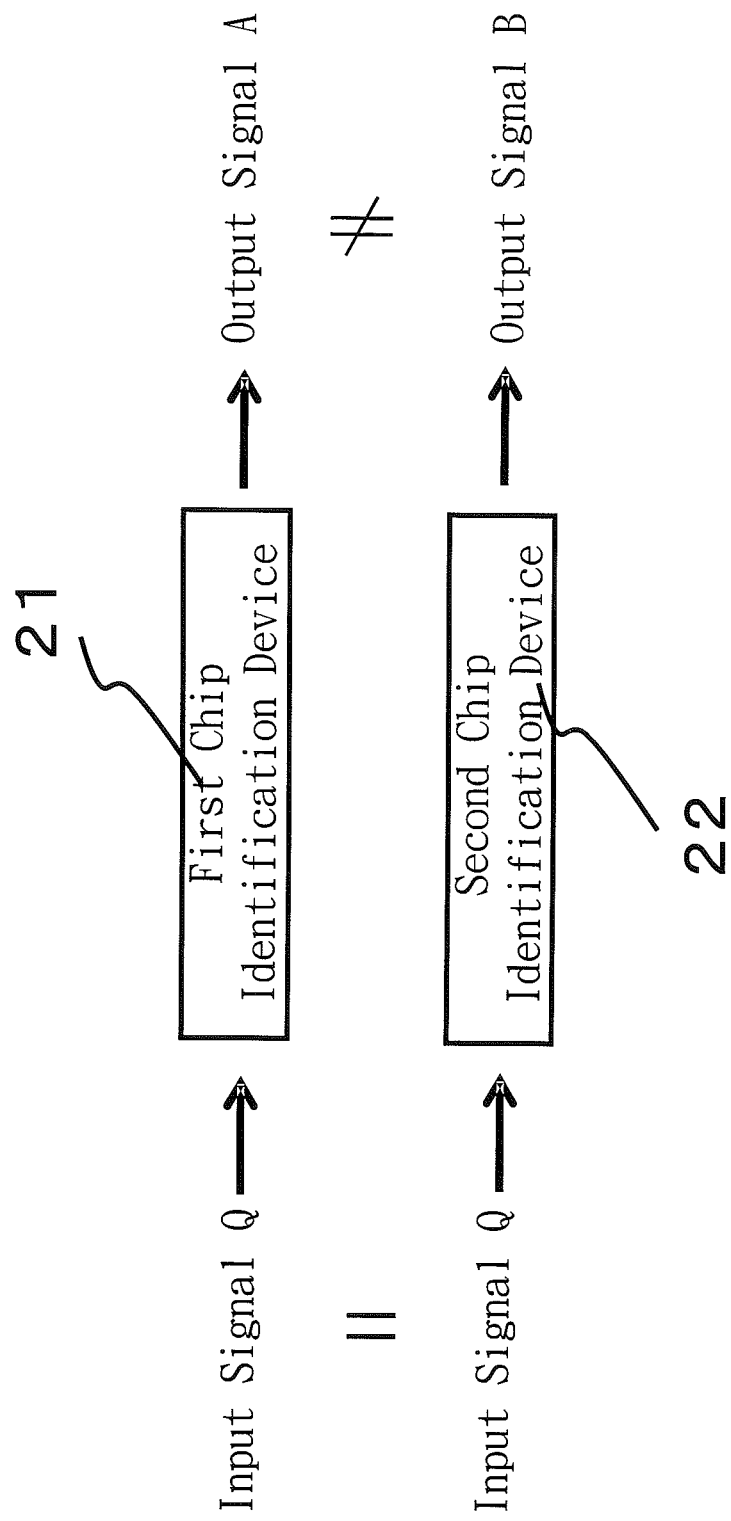
FIG. 16 shows the property of output independence that the chip identification device of the disclosure must satisfy.

(The property of output independence) Firstly, two chip identification devices to be input with identical input signals may output different output signals. As shown in FIG. 16, a first chip identification device 21 and a different second chip identification device 22 may both be input with a same input signal (input signal Q). At the time, the first chip identification device 21 may generate an output signal A, the second chip identification device 22 may generate an output signal B, wherein the output signal A and the output signal B are different. That is, even if the input signals are identical, the output signals may be different when the chip identification devices are different. This property may be a necessary requirement for examples using common passcodes (FIG. 10, FIG. 11, FIG. 12, and FIG. 13). In other words, even if the same common passcodes are sent to the peripheral devices having different chip identification devices as input signals independently, the signals returned from each peripheral device may vary depending on the peripheral device. For instance, as shown in FIG. 10, the first common passcode 1410 is sent to the peripheral devices having different chip identification device, which may be the first peripheral device 410, the second peripheral device 420, and the third peripheral device 430, the output signals returned from the peripheral devices are shown in FIG. 11, which may be the first identification 4101, the second identification 4201, and the third identification 4301. Here, any two of the first identification 4101, the second identification 4201, and the third identification 4301 are different. Similarly, the example shown in FIG. 12 and FIG. 13 may also illustrate the same property.

Figure 17:
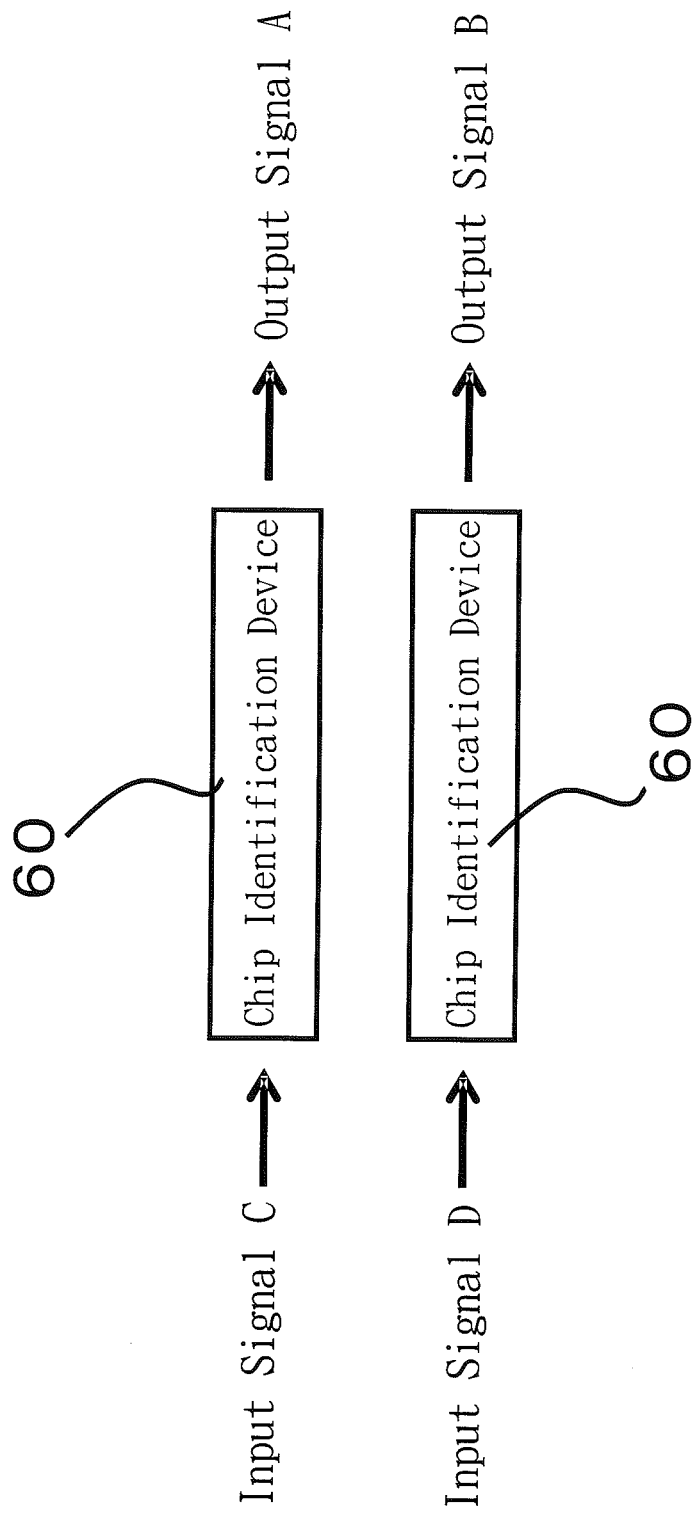
FIG. 17 shows the property of input independence that the chip identification device of the disclosure must satisfy.

(The property of input independence) In contrast, inputting different input signals to identical chip identification device may generate different output signals. For example, as shown in FIG. 17, inputting an input signal C to a chip identification device 60 may generate an output signal A, while inputting an input signal D to the identical chip identification device 60 may generate an output signal B. Here, as long as the input signal C and the input signal D are different, the output signal A and the output signal B may also be different signals. As shown in FIG. 15, the different stem servers sending the different passcodes to the same peripheral device as the input signals, and then the different stem servers may receive the different identifications as the output signals from the same peripheral device. This property may be a necessary requirement. More specifically, the first stem server 1400 may send the first common passcode 1410 to the first peripheral device 410, and the first peripheral device 410 may return to the first stem server 1400 with the first identification 11; the second stem server 2400 may send the second common passcode 2410 to the first peripheral device 410, and the first peripheral device 410 may return to the second stem server 2400 with the second identification 12; and the third stem server 3400 may send the third common passcode 3410 to the first peripheral device 410, and the first peripheral device 410 may return to the third stem server 3400 with the third identification 13.

Therefore, FIG. 14 may present an example satisfying the requirements of the property of input independence and the property of output independence simultaneously. Practically, in almost all situations, the number of the stem servers may be larger than 2, and the number of the peripheral devices may be larger than 5. FIG. 14 may provide the simplest example and not more.

Figure 18:
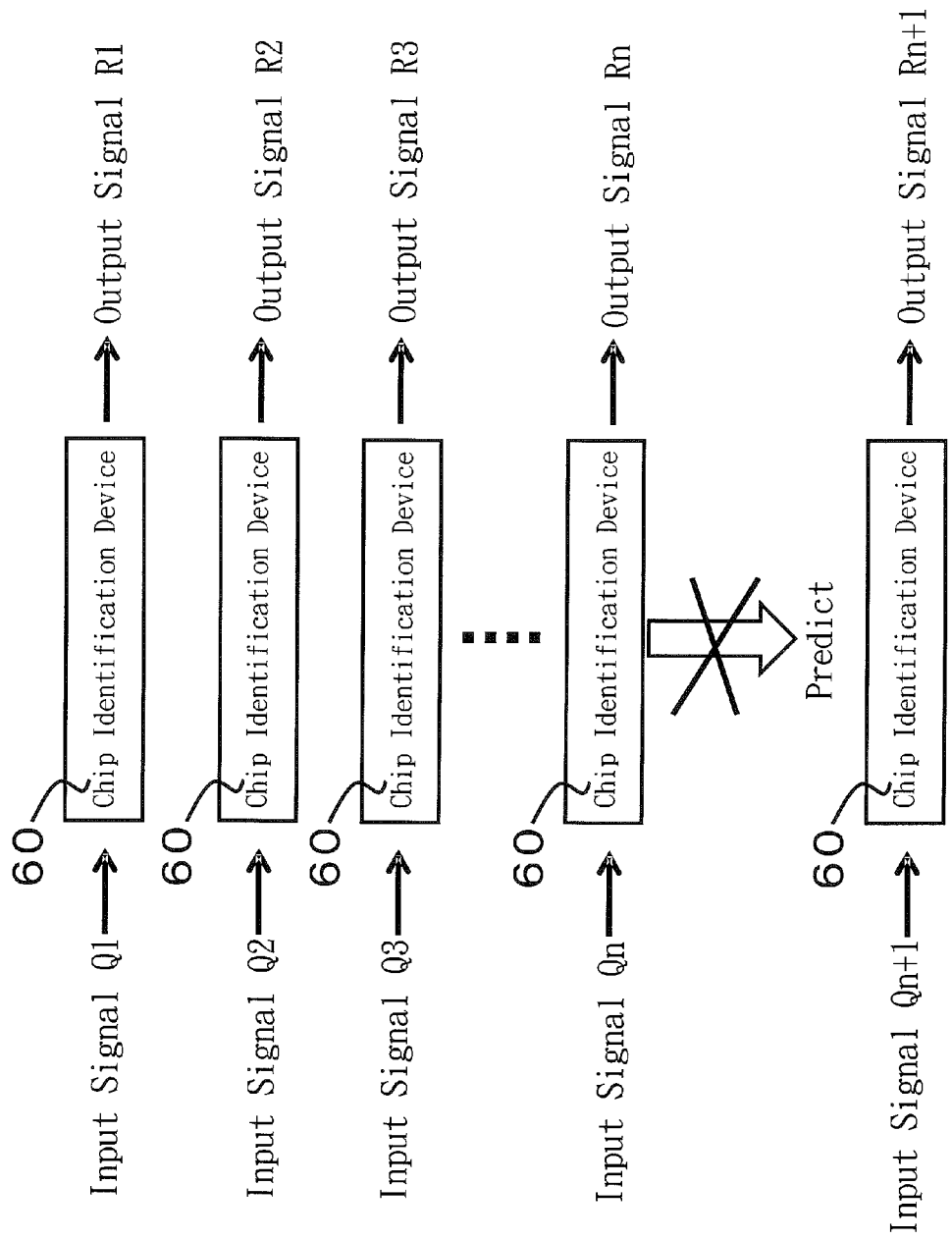
FIG. 18 shows the property of output unpredictability that the chip identification device of the disclosure must satisfy.

(The property of output unpredictability) As shown in FIG. 18, it may already be known that sending n input signals Q1-Qn to the same chip identification device 60, may generate output signals R1-Rn in responding to each input signals. Provided that n is an integer larger than 2, the output signal Rn+1, which may be generated when sending the input signal Qn+1 to the chip identification device 60, may not be predicted based on the combination of (Q1, R1), (Q2, R2), . . . , (Qn, Rn), if the input signal Qn+1, which may be different from any of the n input signals Q1-Qn, is not sent to the same chip identification device 60. If the chip identification device 60 generates output by using a certain algorithm, which means the identification is returned by using software, the requirement may fail. Thus, the chip identification device 60 may have to generate the output signals based on physical randomness. Alternatively, the chip identification device 60 may have to generate the output signals based on physical randomness in advance and store the output signals for use. However, a huge area may be required to store the signals generated based on physical randomness.

Figure 19:
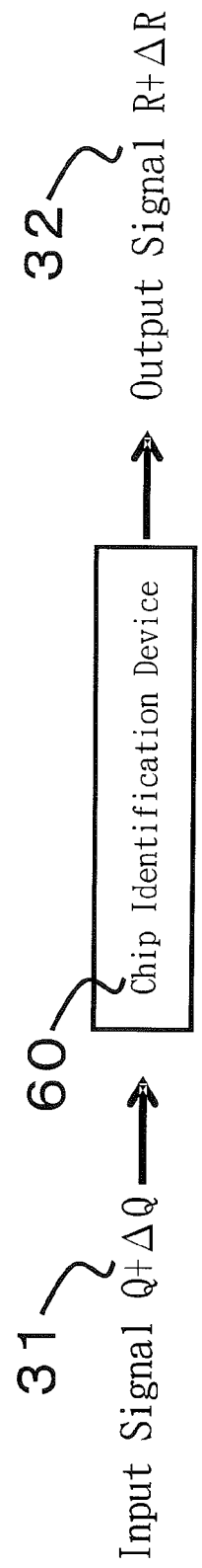
FIG. 19 shows the property of input-output reliability that the chip identification device of the disclosure must satisfy.

(The property of input-output reliability) As shown in FIG. 19, a noise, which may be uncontrollable by a circuit controlling the input signal Q, may cause an input signal error ΔQ (31) to be added to the input signal Q. On the other hand, the input signal error ΔQ (31), which may be uncontrollable by a circuit controlling the output signal R, may cause an output signal error ΔR (32) to be added to the output signal R. In this event, the absolute value of the difference between two different input signals (such as Q1 and Q2) may be larger than the maximum value of the absolute value of the input signal error ΔQ (31). Here, the absolute value of the difference between an output signal R1, which may be in responding to the input signal Q1, and an output signal R2, which may be in responding to the input signal Q2, may have to be larger than the maximum value of the absolute value of the output signal error ΔR (32).

The chip identification method of the disclosure may have to satisfy all four requirements described above simultaneously, namely, the property of output independence, the property of input independence, the property of output unpredictability, and the property of input-output reliability.

(Inspection) When updating a network without the disclosure, which may already exist before applying the disclosure, into the network with the disclosure, the peripheral devices connected to the stem servers may have to be replaced with the peripheral devices comprising the chips embedded with chip identification devices of the disclosure. At the time, it may be needed to inspect whether the replacements have been done completely. Or, it may be needed to inspect whether a portion of the peripheral devices, which may adopt the chips without the chip identification devices of the disclosure, have been inappropriately registered. The inspections here may act as a part of the protection inspection of the stem servers, and thus may be conducted at any time. It may be preferred that the inspections are also conducted when registering the peripheral devices.

The most effective method of conducting the inspection may be to conduct remote attacks on the peripheral devices, which may be the targets of the inspection, from the stem servers serving as the central control. The chips comprised in the peripheral devices, which may be the targets of the inspection, may have to store in the internal memories thereof with corresponding tables of common passcodes and registration codes, if the chip identification devices of the disclosure are not adopted (refer to FIG. 20). The chips embedded with the chip identification devices of the disclosure may not have the codes stored in the internal memories thereof. In the network of the disclosure, only the stem servers may have appropriately stored with the code corresponding tables as shown in FIG. 20. Referring to FIG. 9, the combination of the input codes 402 and the registration codes 403 may provide the corresponding table. The input codes 402 in FIG. 9 corresponds to the input codes 42 in FIG. 20, and the registration codes 403 in FIG. 9 corresponds to the registration codes 43 in FIG. 20.

Figure 21:
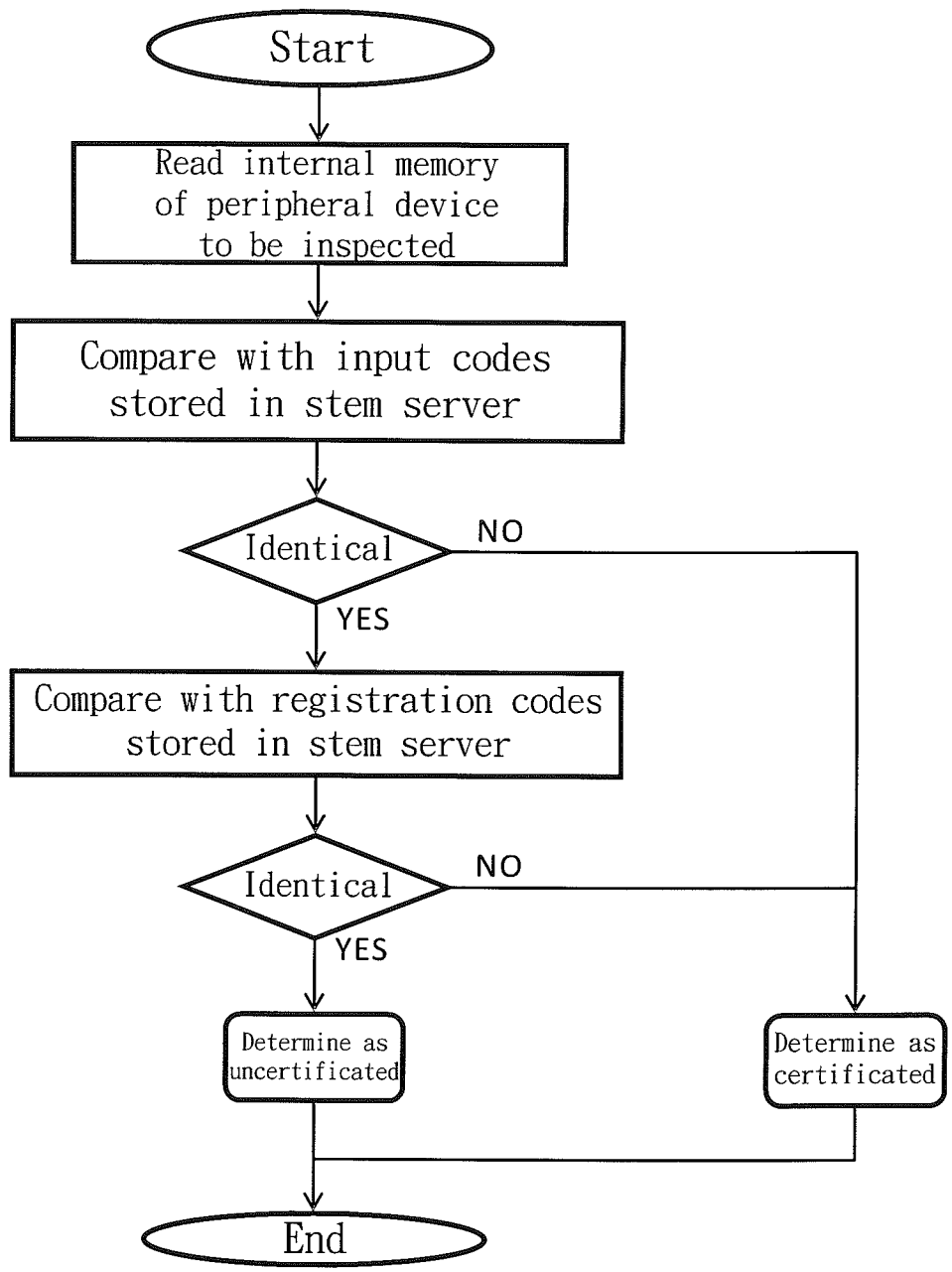
FIG. 21 is a diagrammatic view of process of inspecting the certification of a peripheral device.

The specific process of the inspection may be shown in FIG. 21. Firstly, the internal memories of the peripheral devices to be inspected may be read. Then, whether there may exist identical codes among the input codes stored in the stem server, which may act as input codes 402, may be examined. If no identical codes are found, the peripheral devices under inspection may be determined as certificated. If identical codes are found, whether there may exist identical codes among the registration codes stored in the stem server, which may act as registration codes 403, may be further examined. If identical codes are found, the peripheral devices under inspection may be determined as uncertificated. If no identical codes are found, the peripheral devices under inspection may be determined as certificated.

One of the embodiments of the disclosure may be described below, referring to the figures.

All of the devices comprising the network with the chip identification method of the disclosure, as shown in FIG. 14, may be divided into one group of the stem servers (e.g., 1400 and 2400), which may be protected and managed by well-trained security experts, and another group of the peripheral devices (e.g., 410, 420, 430, 440, and 450), which may not be managed by the security experts. Here, the peripheral devices may not be connected to any other peripheral device, while they may be connected to the stem server. Accordingly, the network unit may be constituted of the stem server and a plurality of the peripheral devices connected directly to the stem server. The stem server may be connected freely with other stem servers, and a peripheral device may be connected to another peripheral device indirectly through a stem server. Thus, a network unit may be connected to another network unit. FIG. 14 provides an example where two network units may form a joint network by connecting the stem servers thereof. Practically, there may be more stem servers, which means, a network comprising more network units may be formed. Each peripheral device may have different chip identification device. As shown in FIG. 10 and FIG. 12, the stem servers (1400 and 2400) may have stored at least one intrinsic common passcodes (1410 and 2410), respectively. Referring to FIG. 9, the common passcodes (1410 and 2410) sent by the stem servers (1400 and 2400) may be securely stored in the internal memories thereof as input codes (e.g., 402). Referring to FIG. 11 and FIG. 13, the peripheral devices (410, 420, and 430) input with the common passcodes (1410 and 2410) may return to the stem server (1400 and 2400) with the intrinsic identifications (4101, 4201, and 4301) and (4102, 4202, and 4302), in responding to the same common passcodes, respectively. Here, the returned identifications may differ from each other. Thus, the chip identification devices of the disclosure embedded in the peripheral devices may have to satisfy the property of output independence, as shown in FIG. 16. Referring to FIG. 9, stem server may compare conveniently the output codes (identification codes) returned by the peripheral devices in responding to each input code (e.g., 402) and the registration codes (e.g., 403), which may be securely stored in the internal memories of the stem server. Referring to FIG. 15, a peripheral device may be allowed to connect with a plurality of stem servers. In this event, a peripheral device (e.g., 410) may be input with a plurality of common passcodes (e.g., 1410, 2410, and 3410), and then different identifications (e.g., 11, 12, and 13) may have to be returned to those stem servers in responding to different inputs, respectively. Thus, as shown in FIG. 17, the chip identification device may have to satisfy the property of input independence.

Next, let us consider the requirements regarding the chip identification device of the disclosure. Firstly, when forming the chip identification devices with a program, the output signals (the identification codes) in responding to the input codes, may have to be generated by using a certain algorithm. Thus, when the remote attacker (e.g., 93) decodes the algorithm, the registration codes may be made up as shown in FIG. 20, if the input codes are known. By doing so, the remote attacker may steal some of peripheral devices, and may be able to inappropriately access the stem server. To preclude such an inappropriate conduct, the chip identification device of the disclosure may have to satisfy the property of the output unpredictability, as shown in FIG. 18. However, once the programs are designed with algorithm, any program may never satisfy the property of the output unpredictability. That is, it may be impossible to generate totally random codes by using any programs and any algorithm. Therefore, the chip identification device of the disclosure may have to adopt the physical randomness.

The chip identification device described above may be mixed with and carried along with semiconductor chips comprising modules providing other functions, while it may also be possible to independently manufacture semiconductor chips only having the chip identification function. Moreover, it may be preferred that the chip identification device generates the output signals (the identification codes) adopting the physical randomness, after receiving the input codes (the common passcodes). However, if a sufficiently large capacity in the memory may be ensured, the same effect may also be achieved by storing in the internal memory with the additional signal codes generated by the physical random number generator. However, even in this event, the common passcodes still may not be stored in the internal memories of the peripheral devices. No matter which application may be adopted, the chip identification device itself may be an electronic appliance fulfilled with a semiconductor chip. Furthermore, the network may be a network of electronic appliance, comprised of the components of the peripheral devices and the components of the stem servers, wherein the peripheral devices and the stem servers may be comprised of semiconductors.

The First Embodiment

Figure 23:
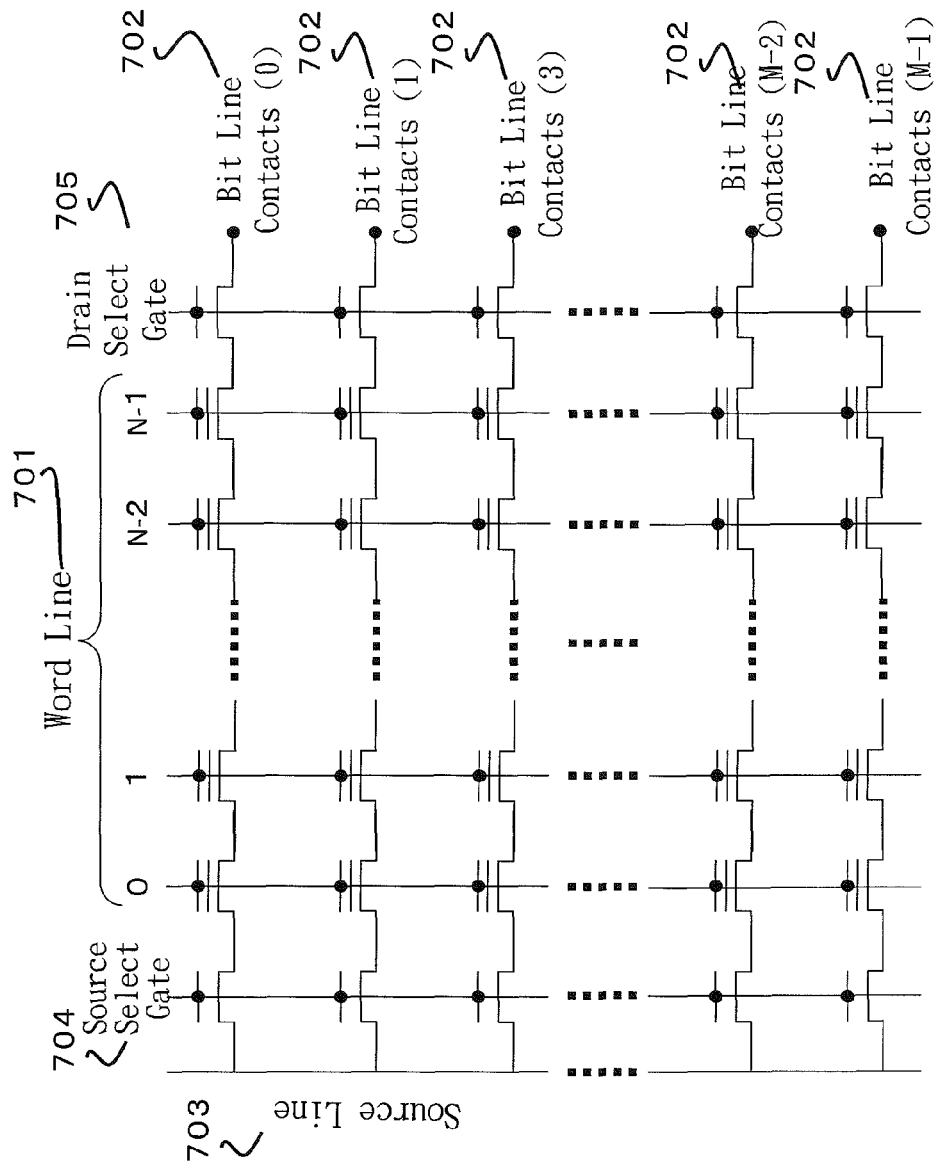
FIG. 23 is a diagrammatic view of arrays of NAND-type nonvolatile memory cells.
Figure 24:
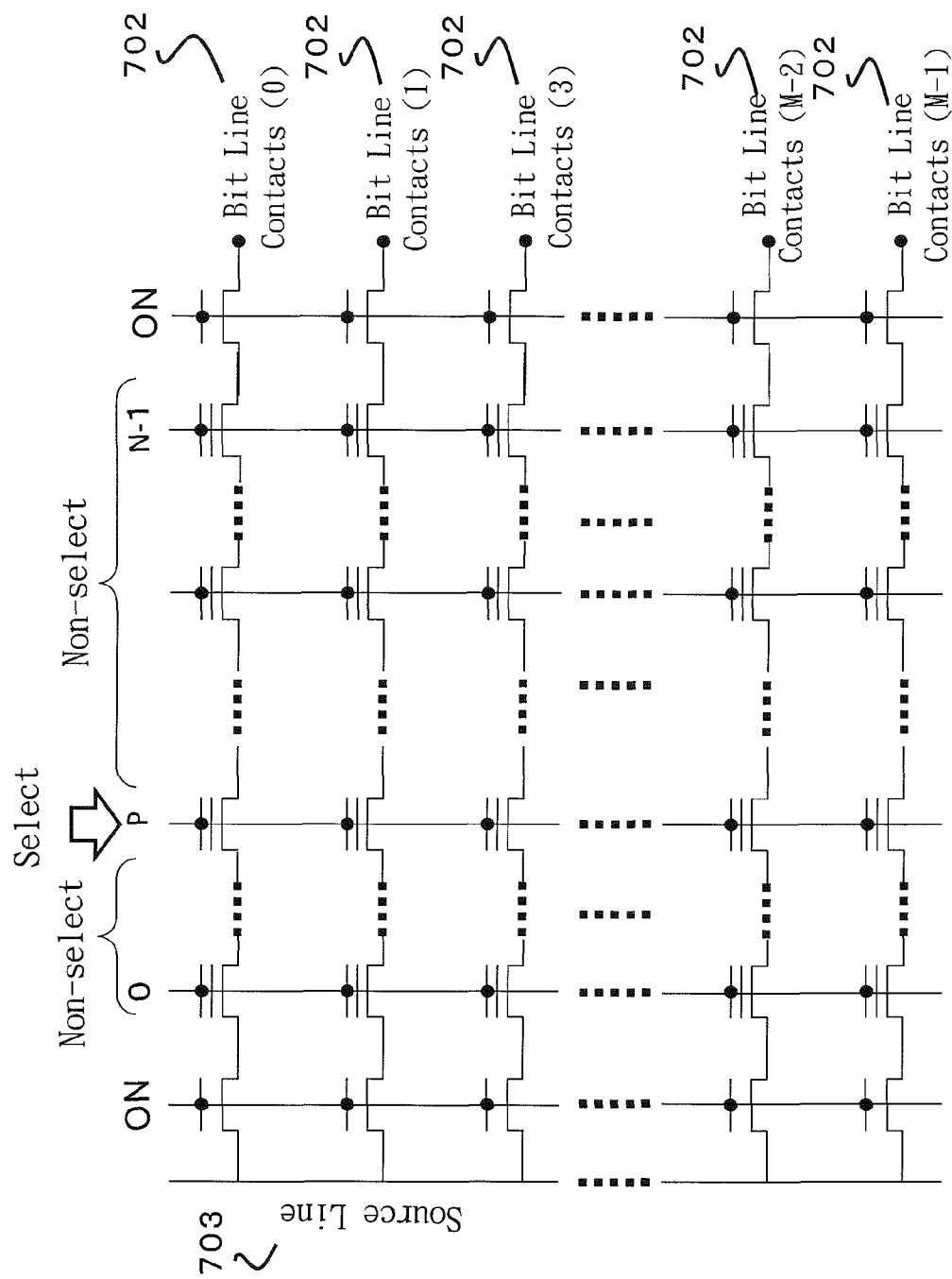
FIG. 24 is a diagrammatic view of a method of selecting page P of arrays of NAND-type nonvolatile memory cells.
Figure 25:
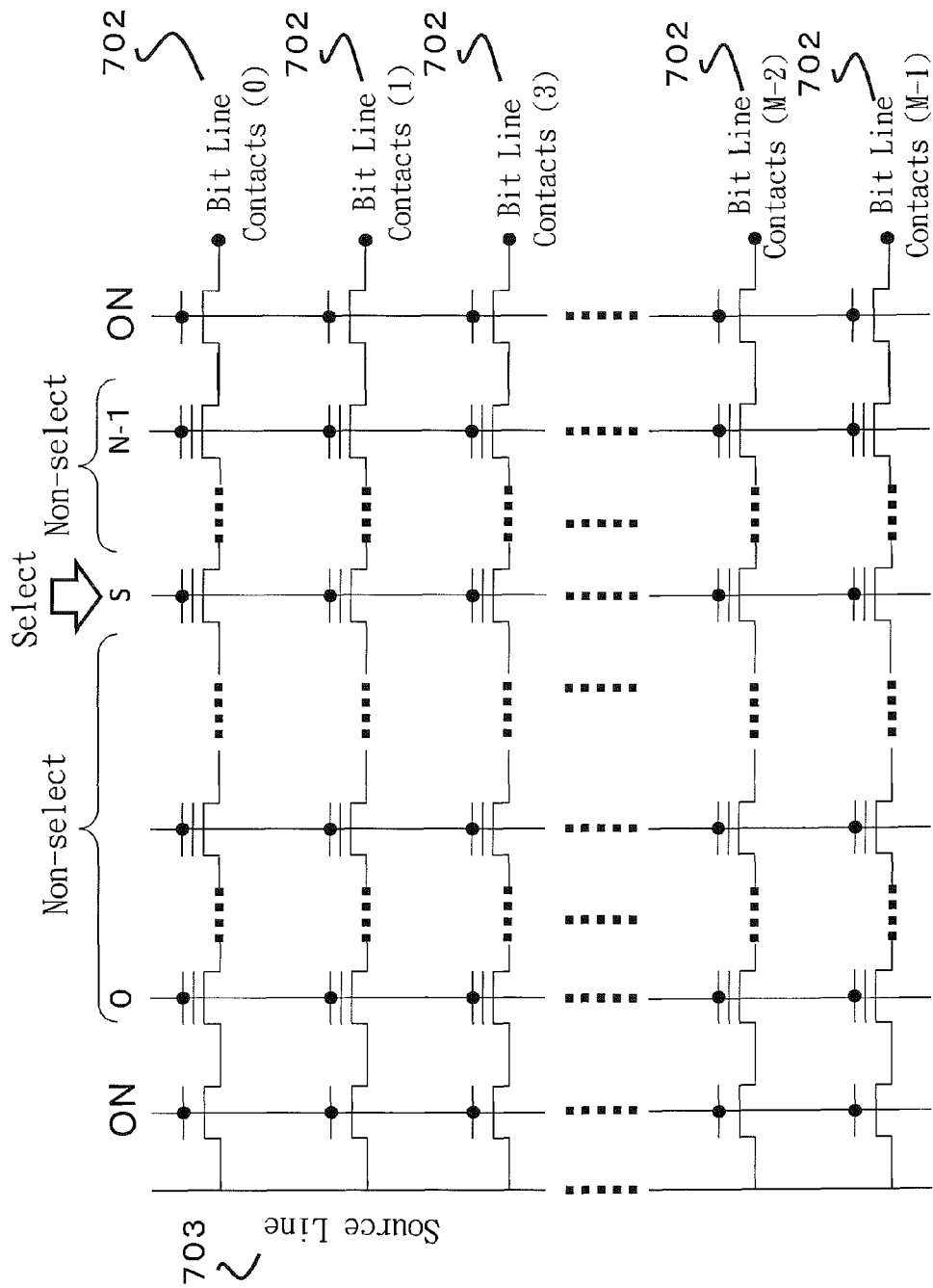
FIG. 25 is a diagrammatic view of a method of selecting page S of arrays of NAND-type nonvolatile memory cells.

The chip identification device of the disclosure may be formed on a semiconductor nonvolatile memory. Firstly, let us use the physical random number generator to generate random combinations of "1"s and "0"s. For example, the checker pattern shown in FIG. 22 with randomly disposed white and black blocks may be generated by using black color to represent "1"s and using white color to represent "0"s, and writing them into the memory cell arrays of the nonvolatile memory. The nonvolatile memory arrays may be NAND-type, as shown in FIG. 23. Referring to FIG. 24, a source select gate 704 and a drain select gate 705 are set as ON, a word line in a row P is selected by applying a read voltage thereto, a pass voltage is applied to unselected word lines, and then arrays comprised of "1"s and "0"s may start to form from the top column, in responding to each bit line 702. In the example shown in FIG. 22, the array generated may be "WWBWWBWWWB . . . " from the top. This may correspond to the data generated, "0010010001 . . . ", from the top in the page P (the row P) in FIG. 24. Here, the adopted nonvolatile memory may also be NOR-type. However, NAND-type may be better than NOR-type on the simplicity and the speed of reading, because NAND-type may read each bit line 702 on every page (every line) simultaneously. Here, the selection of the row P (the page P) may be an input of the chip identification device. However, the input may also be appointed to rows other than the row P. After selecting row P, FIG. 25 shows another example selecting a row S. The output may be "BBWBWBWWW W . . . " in FIG. 22. That is, generating "1101010000 . . . ". Next, as an example not specifically shown in the figures, selecting a row T may generate "001010011101010 . . . ". Repeat and input (P, S, T, . . . ) in order. Here, (P, S, T, . . . ) may be equivalent to the input codes (102 and 402) in the examples such as in FIG. 5 and FIG. 9. By doing so, the arrays of "1"s and "0"s may be composed and be output. For instance, output "0010010001 . . . ", "11010100 00 . . . ", "001010011101010 . . . ". It may be enough to use these as the identification codes sent by the peripheral devices. As shown in FIG. 9, the identification codes may be associated with the input codes (P, S, T, . . . ) 402, and compared with the registration code 403, which may be stored in the stem server 400.

Figure 5:
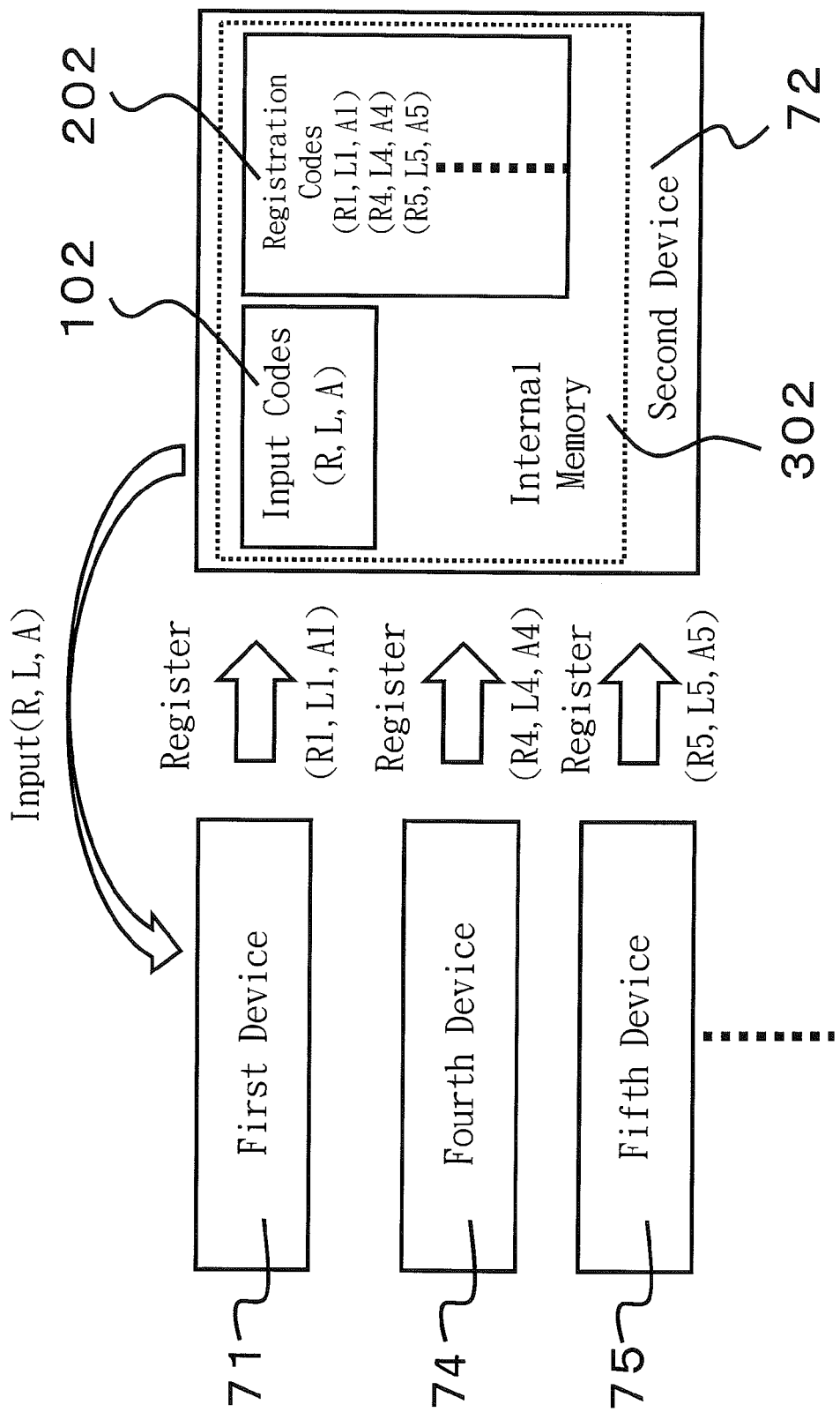
FIG. 5 shows the method of the device comprising the chip embedded with the chip identification device of the disclosure registering with a device connected to the chip identification device of the disclosure.
Figure 26:
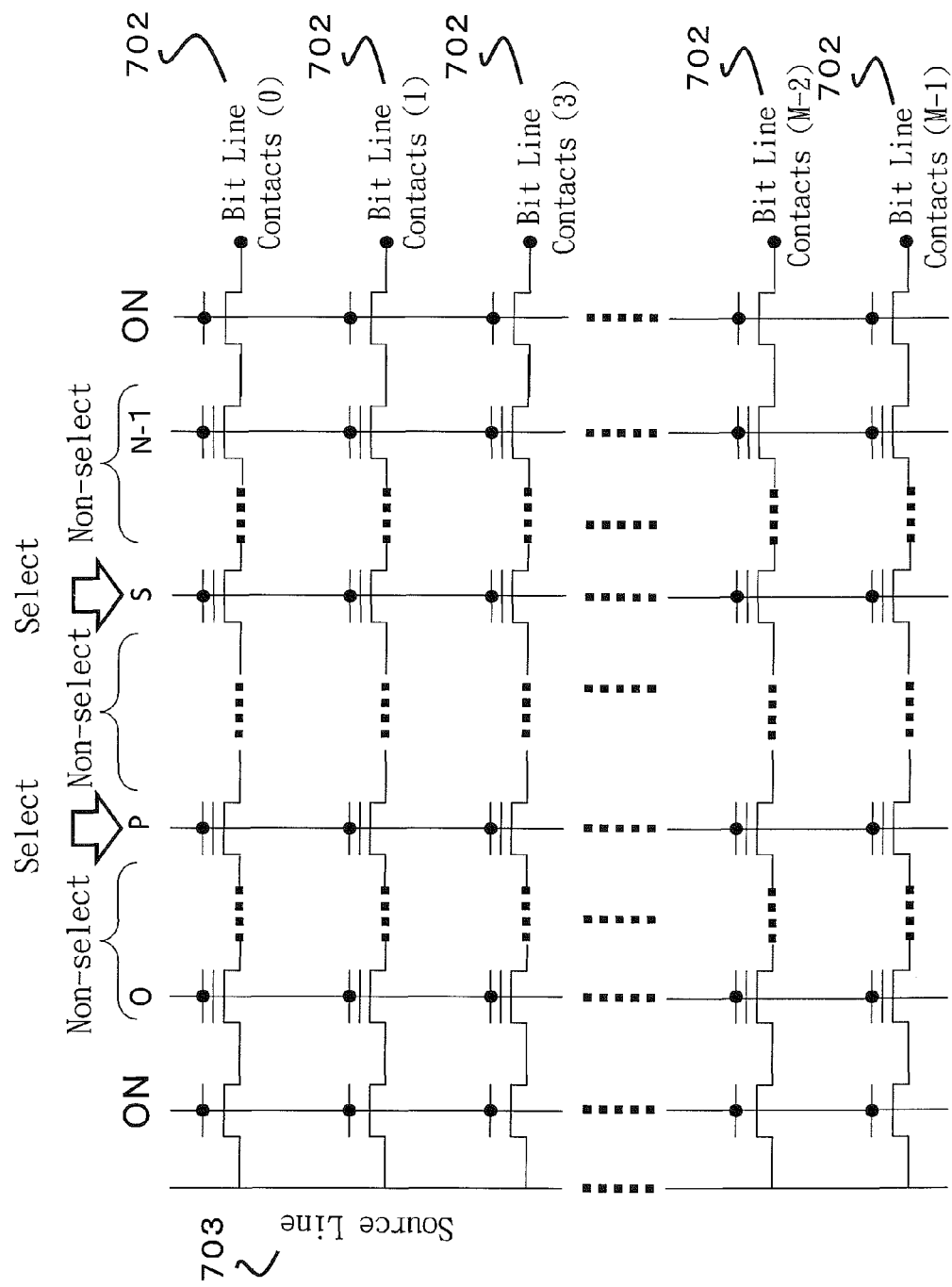
FIG. 26 is a diagrammatic view of a method of selecting page P and page S of arrays of NAND-type nonvolatile memory cells.

Referring to FIG. 26, acting as input codes, the row P and the row S may be selected simultaneously. It may also be possible to select more than three rows at the same time. However, permutations may provide more cases than combinations, it may thus be preferred that input codes are input orderly with one or two signals. Such input codes may be securely stored in the stem servers as the common passcodes to be used for the communications between the stem servers and the peripheral devices, as shown in FIG. 5 and FIG. 9.

Figure 22:
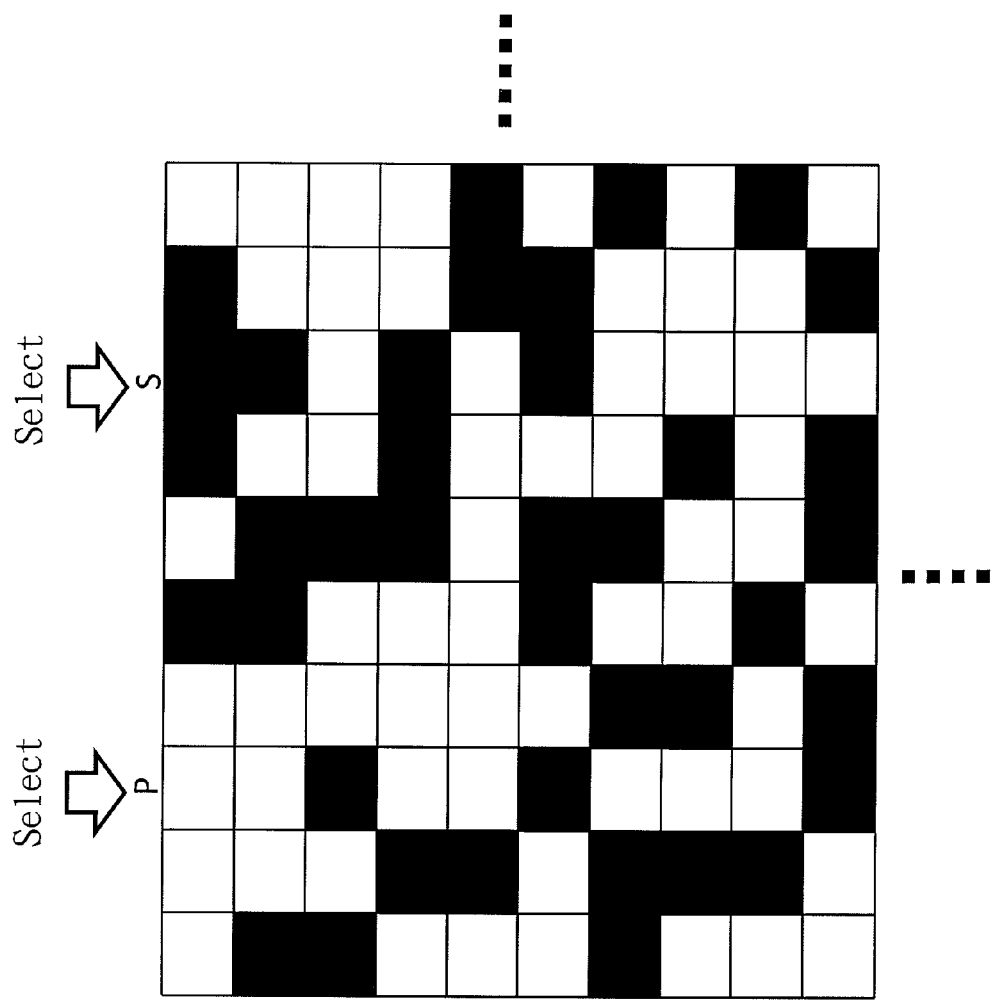
FIG. 22 is a diagrammatic view of data segmented into arrays of nonvolatile memory cells.

In the embodiment, as shown in FIG. 22, the data may be written into the nonvolatile memory arrays. However, the input codes (the common passcodes) may only designate the row (the page, if in NAND-type) for reading, thus may not have been stored in any area of the memories in the peripheral devices. As described above, the communication series 80 shown in FIG. 6 may be composed of the combinations of the input codes and the identification codes (or registration codes). Therefore, even if the remote attacker steals the data stored in the memory arrays of the chip identification devices, the communication series composed of the input codes and the identification codes may not be reproduced.

Referring to FIG. 22, the data written into the nonvolatile memory arrays may also be the data generated by the physical random number generator. Thus, if the data is big enough, it may not be decoded by almost any algorithm. Therefore, the property of output unpredictability may be ensured.

Writing the random data generated by the physical random number generator into the memory cell arrays may be conducted when initializing the chips comprising the chip identification devices in the first embodiment of the disclosure. The initializations may be conducted when being collected in the factories, sold by a sales branch, identified by the identification organizations, or used by the end-users.

The Second Embodiment

An example of realizing the semiconductor of the chip identification device of the disclosure may be composing the chip identification device with a plurality of groups of the nonvolatile memory cells.

Figure 27:
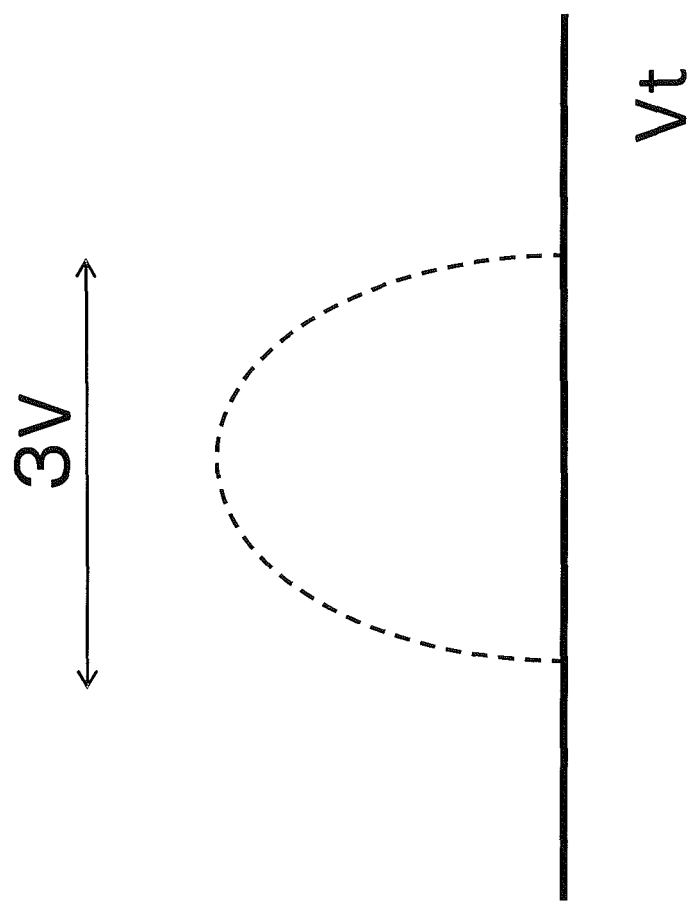
FIG. 27 is a diagrammatic view of the threshold voltage distribution of an assembly of nonvolatile memory cells after batch erase and batch writing.

Firstly, a group of nonvolatile semiconductor memory cells manufactured by a production line in the standard mass production level is erased simultaneously and then written simultaneously. Afterwards, the distribution of threshold voltage (Vt) may be obtained by reading Vt of those memory cells. It is known that the distribution of threshold voltage (Vt) of plurality of nonvolatile semiconductor memory cells manufactured by a production line in the standard mass production level may be presented as the distribution shown in FIG. 27 depicted the dotted line with the width being 3V, if obtained by this method.

Figure 28:
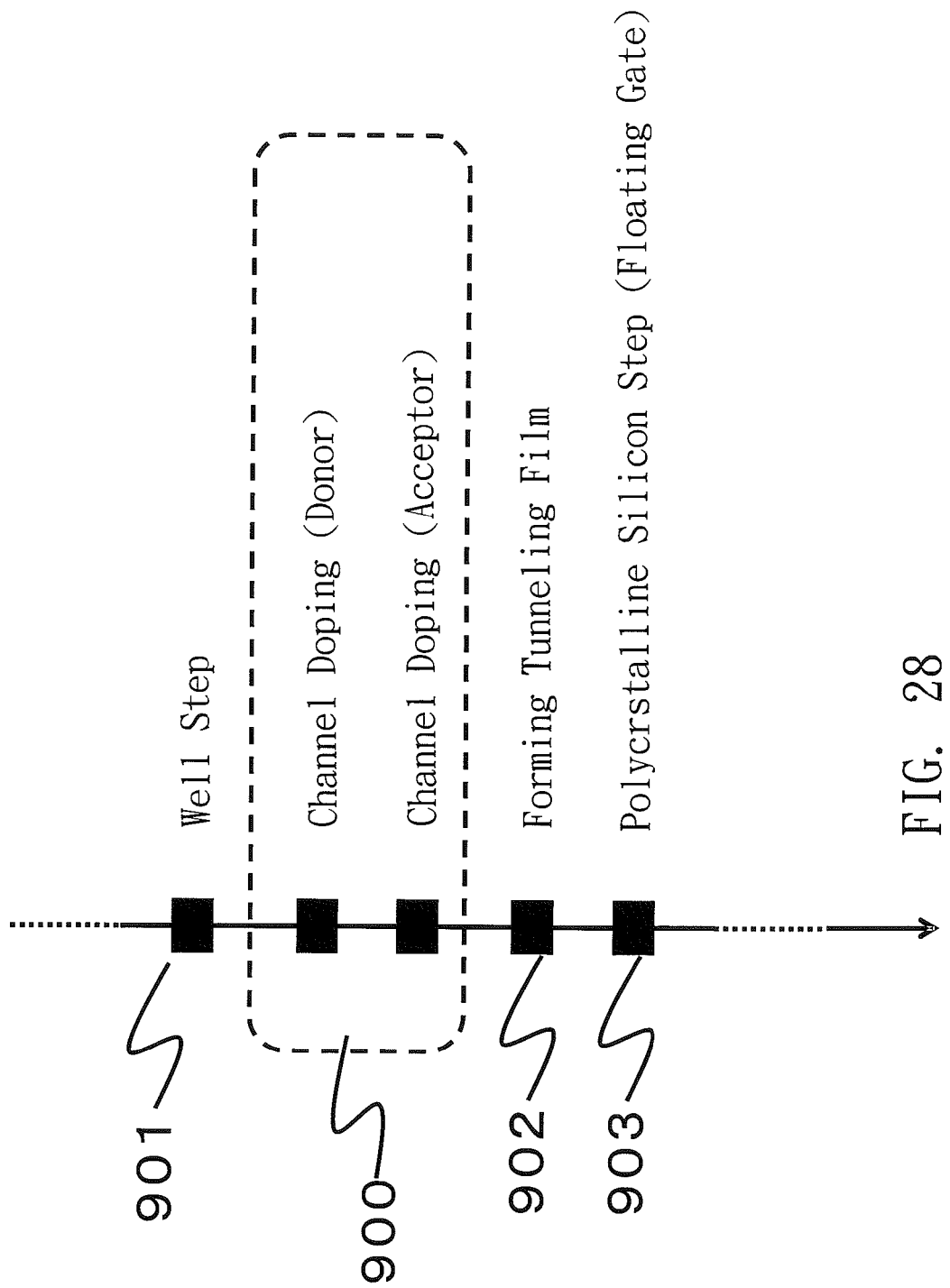
FIG. 28 is a diagrammatic view of the manufacturing process in the second embodiment of the disclosure.
Figure 29:
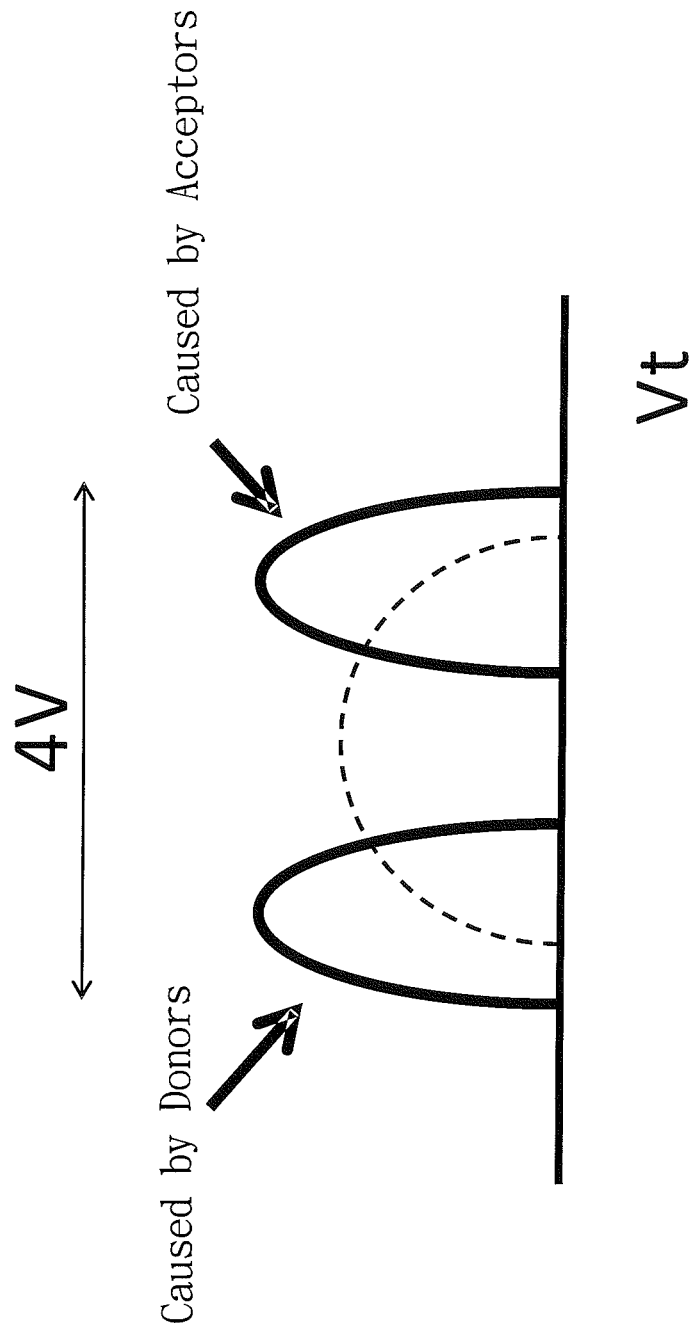
FIG. 29 is a diagrammatic view of the threshold voltage distribution of the nonvolatile memory cells in the second embodiment of the disclosure.

Next, referring to FIG. 28, let us change a part of the manufacturing recipe of the standard production lines. In the manufacturing process of the standard production lines, a channel doping step 900 may be added between a well step 901 and a tunnel film forming step 902, wherein the channel doping step may adopt a low energy channel ion doping method to dope donors and acceptors at a same concentration in shallow layers of the whole well, and then back to the standard production lines through the tunnel film forming step 902 and a polycrystalline silicon step 903. As a result, in some of the memory cells, the donor ions may be distributed more around a source diffusion layer, and the Vt may be reduced. On the other hand, in some of the memory cells, the acceptor ions may be distributed more around a source diffusion layer, and the Vt may be increased. By doing so, the Vt distribution obtained by reading after the batch erase and the batch writing as shown in FIG. 27, may expand into a distribution with three peaks as shown in FIG. 29. The left side may comprise a plurality of memory cells with the decrease of Vt caused by the donors. The right side may comprise a plurality of memory cells with the increase of Vt caused by the acceptors. On the contrary, the distribution depicted the dotted line in the center may be lower than the distribution shown in FIG. 27. The width of the distribution composed of the three peaks may be approximately 4V. Here, the distribution depicted the dotted line in the center may be the distribution with less fluctuation owing to donors and acceptors, and thus may have the same width as the distribution of the memory cells manufactured by the standard production lines without the disclosure. That is, it may be caused by uncertain factors, such as wiring delay, traps accidentally made in the forming process of tunnel film, or manufacturing uncertain factors like gate patterning or thickness of tunnel film. Among these, it is known that the trap-related uncertainty may be dynamically fluctuated because traps are repeatedly activated and inactivated during the cycle of write and erasure, during the stand-by as is, or during heating the chip. Then, the uncertainty may cause a significant problem in the controlling of the threshold voltage. On the other hand, the change (the peaks on the left and the right in FIG. 29) of the distribution caused by the doping of the channel ions of the disclosure may be related to the ion distribution in the channel, and may not be related to the trap. Thus, the change may be less visible during the cycle of writing and erasing, during the stand-by as is, or during heating the chip. Furthermore, the distribution of the donor ions and the acceptor ions in the channel may cause physical randomness in threshold voltage distribution. For instance, as shown in FIG. 29, the right side of the distribution may be caused by more acceptors (anions) distributed on the source diffusion layer side in the channel. The left side of the distribution may be caused by more donors (cations) distributed on the source diffusion layer side in the channel.

Figure 30:
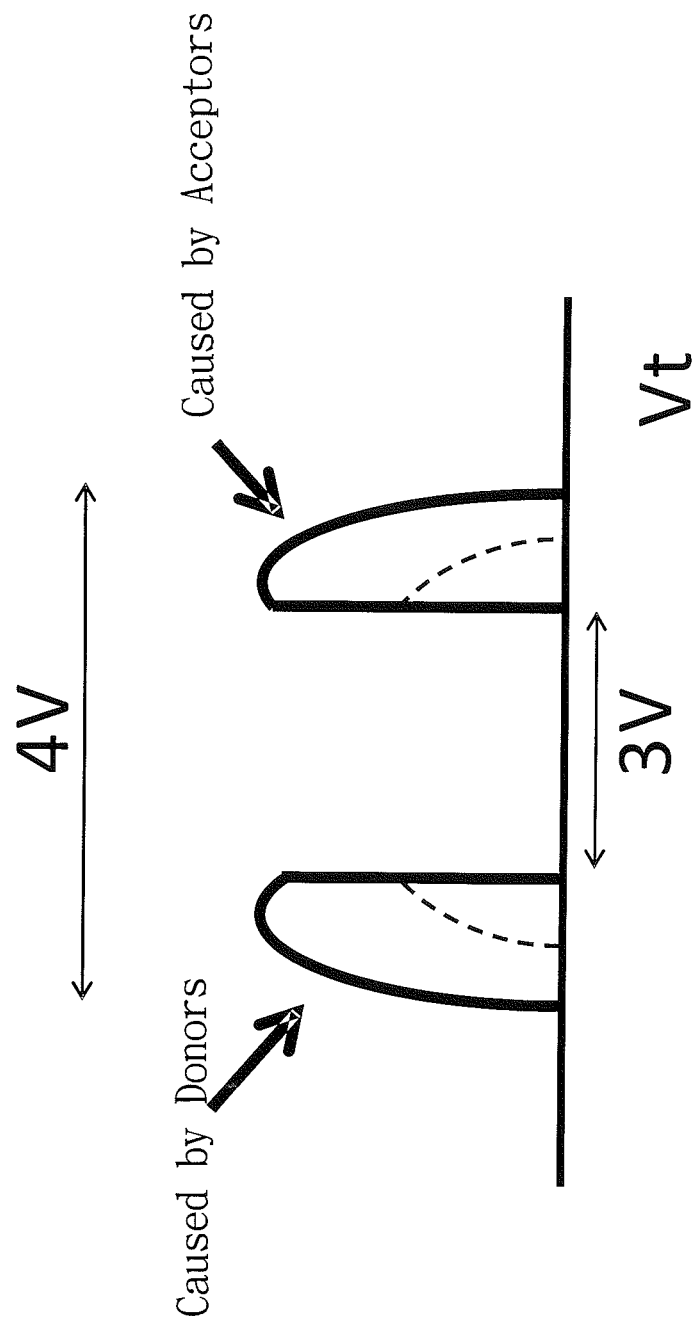
FIG. 30 is a diagrammatic view of the threshold voltage distribution of the nonvolatile memory cells in the second embodiment of the disclosure.

FIG. 30 shows an example removing the memory cells in responding to the 3V width in the center of the distribution shown in FIG. 29. The address of the removed memory cell may be stored in the in areas such as a buffer. The remote attacker may be impossible to obtain sufficient information regarding the input codes even if he can steal the address data stored in the buffer.

Figure 31:
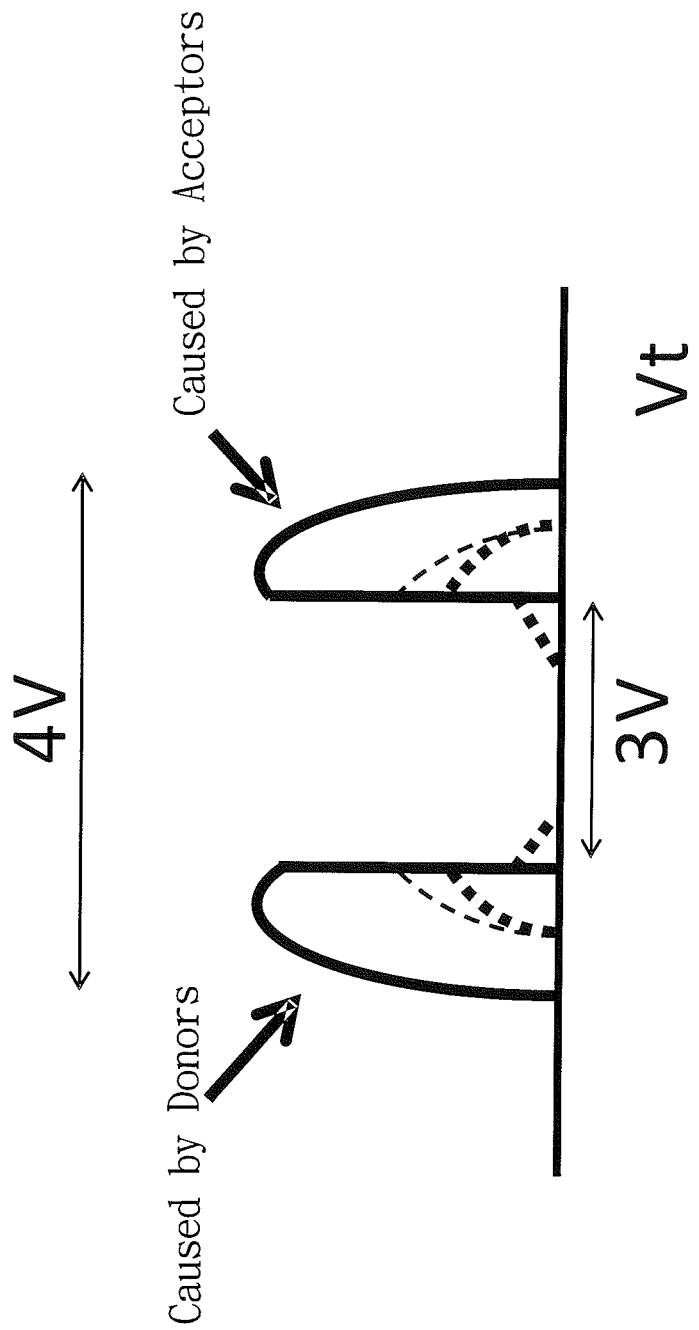
FIG. 31 is a diagrammatic view of the threshold voltage distribution of the nonvolatile memory cells in the second embodiment of the disclosure.
Figure 32:
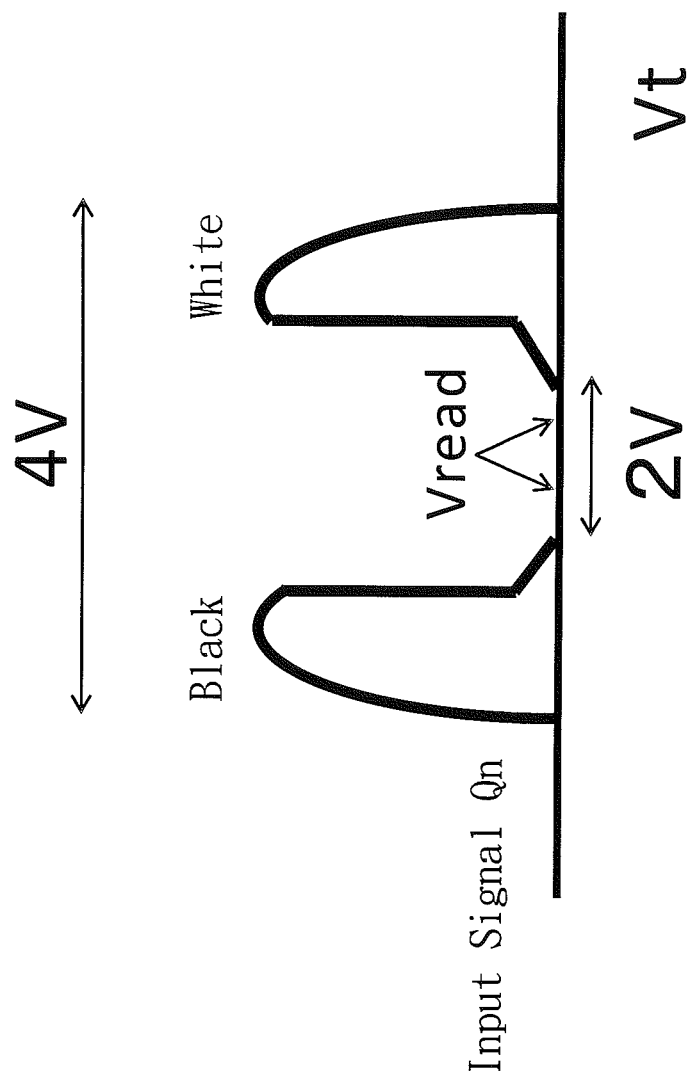
FIG. 32 is a diagrammatic view of the threshold voltage distribution of the nonvolatile memory cells in the second embodiment of the disclosure.

As indicated by the dotted lines in FIG. 30, there may be some remaining distributions not related to the fluctuation of donors and acceptors at the source end, which is caused by the channel doping of the disclosure. Some of the memory cells in the distribution may change owing to activation and inactivation of traps during the repeated write and erase, during the stand-by as is, or during heating the chip. As a result, some cells in the distribution, tails of the peaks may invade into a gap in the center, as shown in FIG. 31. However, because there is an ample width, approximately 3V, reserved in the embodiment, the gap left even after the invasion may be approximately 2V, as shown in FIG. 32. Let us apply the read voltage equivalent to the voltage in the gap to the selected word line (the selected row or page), and apply the pass voltage to the unselected word lines. If the current flows through the bit line, the memory cell at the intersection of the selected bit line and the selected word line may be regarded as black (that is, "1"); if no current flows, the memory cell at the intersection of a the selected bit line and the selected word line may be regarded as white (that is, "0"). Even when considering the fluctuation of the read voltage, the 2V may be an enough gap to distinguish between black and white. In order to ensure the property of input-output reliability illustrated by FIG. 9, the width of the gap may have to be sufficiently large.

Accordingly, by using the fluctuation of the spatial distribution of donor ions and acceptor ions, which is made at the channel doping step 900, the black and white checker pattern as shown in FIG. 22 may be generated. Thus, the embodiment may be realized by utilizing the uncontrollable physical randomness in the semiconductor manufacturing process, without using any algorithm.

Figure 33:
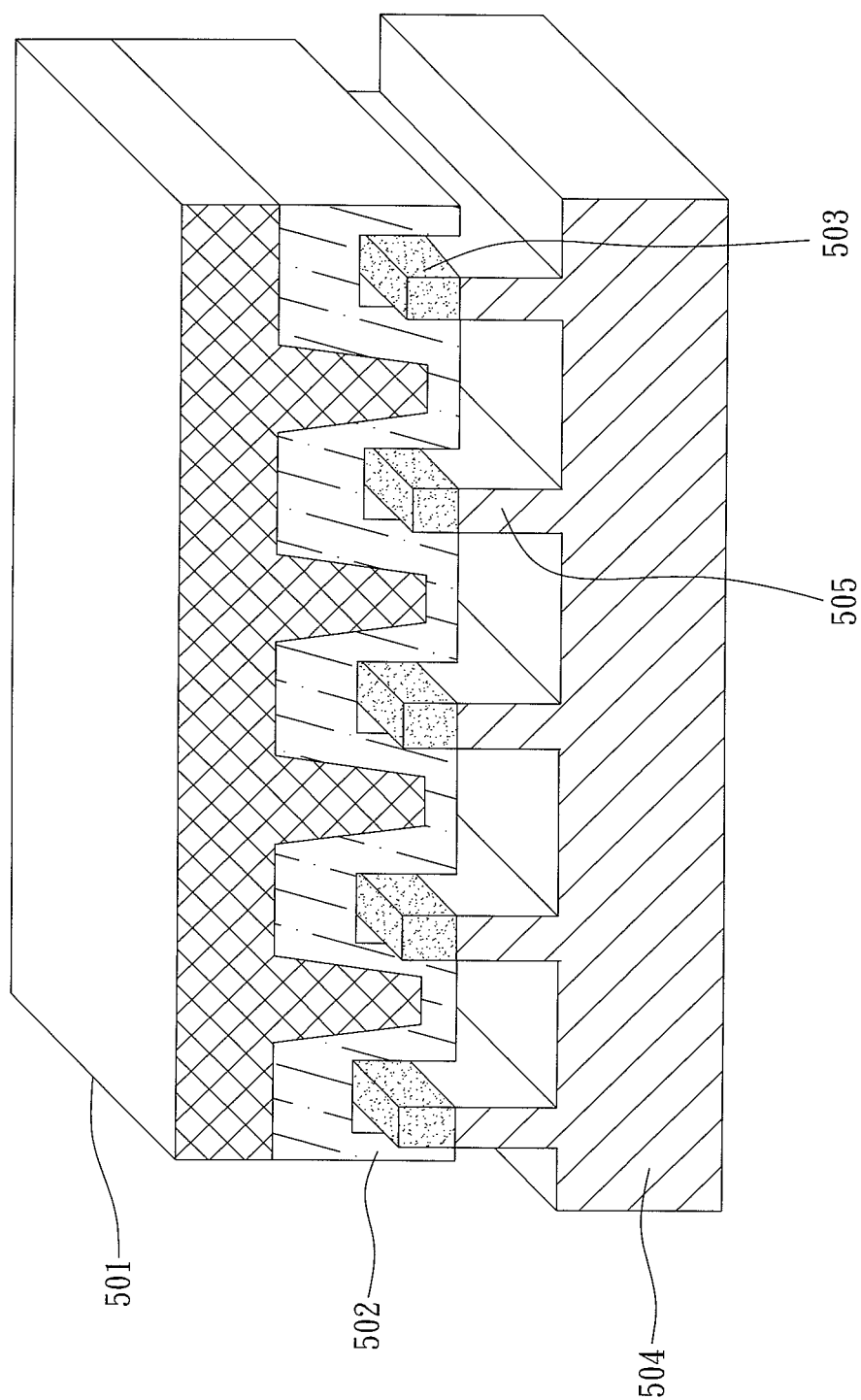
FIG. 33 is a top view of nonvolatile memory cell arrays.
Figure 34:
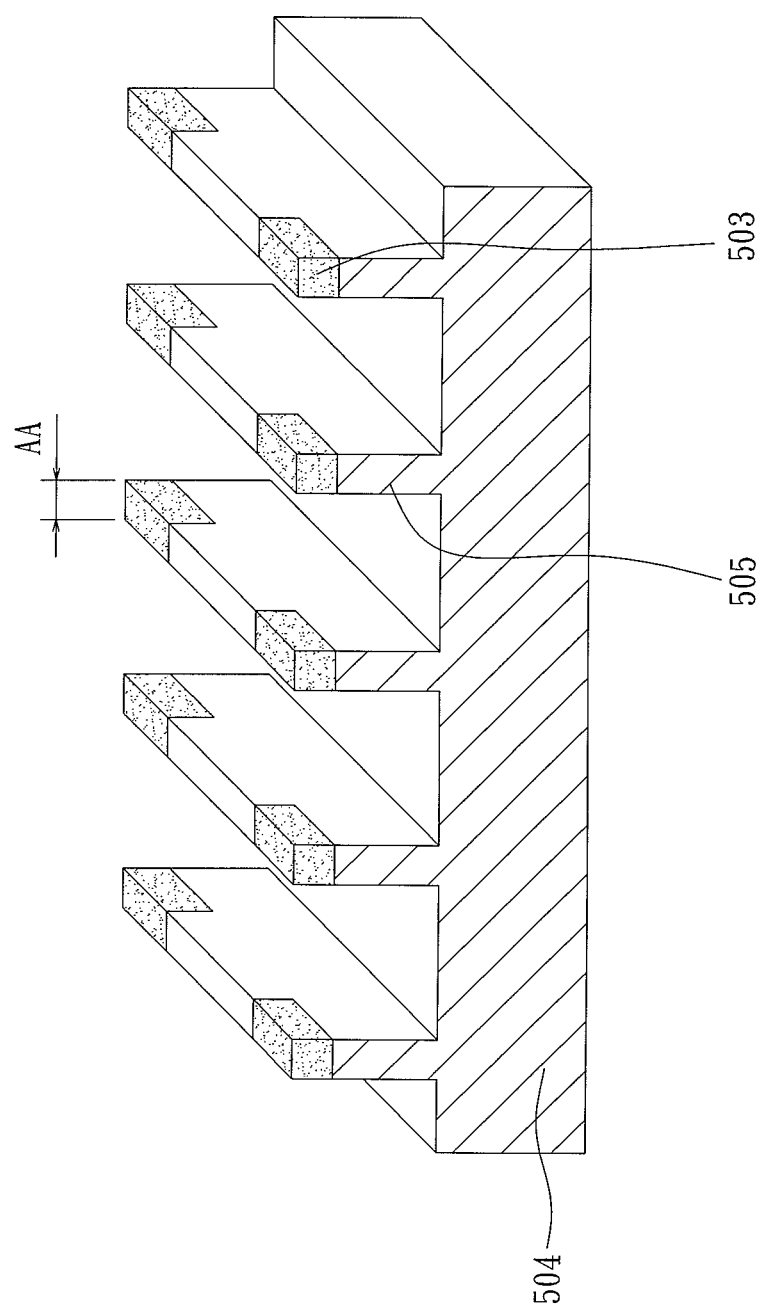
FIG. 34 is a top view of a comb-shaped substrate of the nonvolatile memory cell arrays.

FIG. 33 shows the bird's eye view of the NAND-type nonvolatile memory cell structure. A surface of a substrate 504 may be manufactured in comb-shaped, and active areas 505 may be exposed parallel on the surface from one side of the paper to the other. A control gate 501 directly connected to the word lines 701 in FIG. 23 may be perpendicular to the active areas 505, then extending crosswise direction, and cover the tip of the active areas 505 with a polycrystalline silicon interlayer dielectric film 502 therebetween. There are the diffusion layers 503 in the near side and in the opposite side of the active areas 505. FIG. 34 shows the bird's eye view that the control gate 501 and the polycrystalline silicon interlayer dielectric film 502 are removed from FIG. 33. A width AA of the active areas 505 may reduce along with the miniaturization of the device. Currently, the most advanced technology may miniaturize the width AA to a size smaller than 20 nm.

Figure 35:
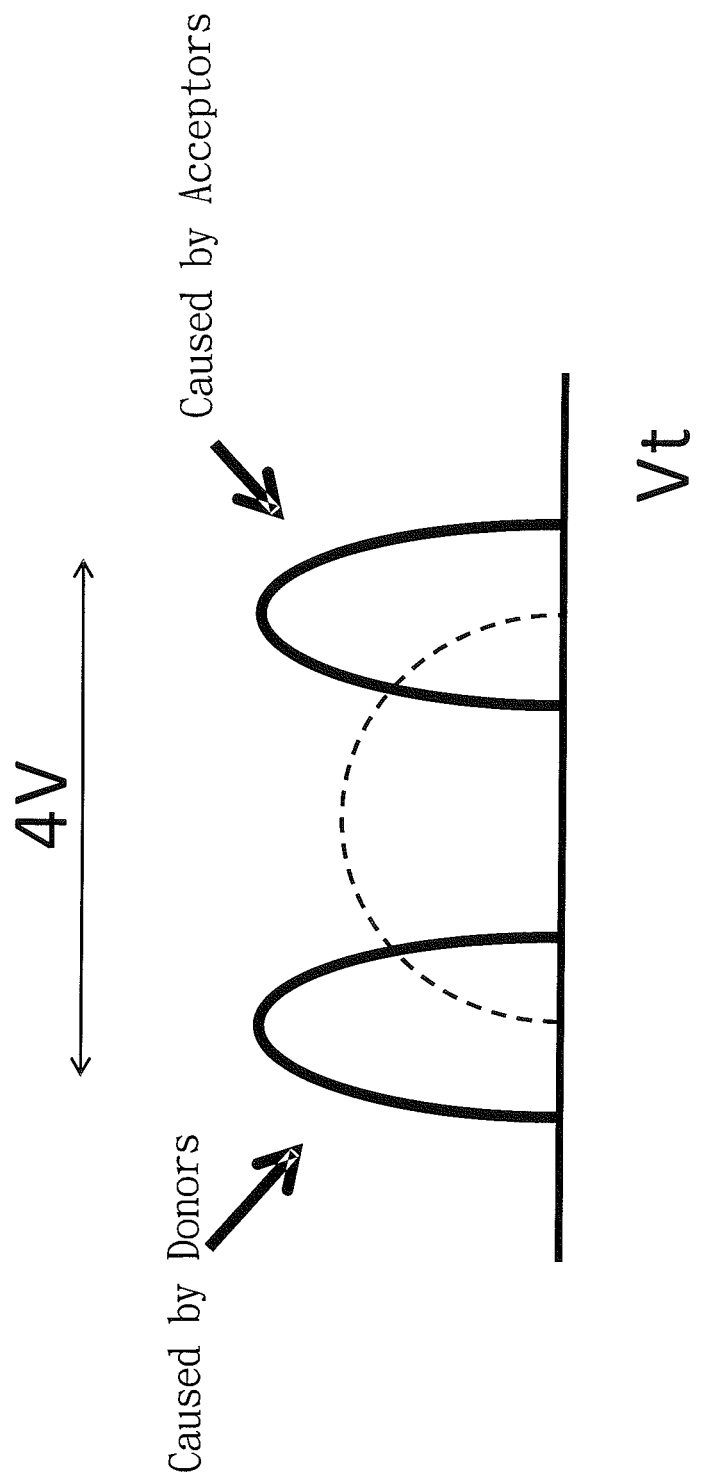
FIG. 35 is a diagrammatic view of the threshold voltage distribution of the nonvolatile memory cells in the second embodiment of the disclosure.

The width AA reduces with the miniaturization may correspond to the expansion of the gap between the peak caused by the donors and the peak caused by the acceptors in FIG. 29. One of the examples is shown in FIG. 35. As in the example described above, the cells corresponding to inside the 3V gap between the peaks may be removed from the distribution, and the address of the removed memory cells may be stored in the buffer. Those address data may not be related to the passcodes, and thus no problem may be caused even when stolen by the remote attacker. As described above, considering the tails of the distribution caused by the traps, the resultant distribution may be illustrated in FIG. 36. This may correspond to the example described above in FIG. 31. Because the original gap may be large, the leakage toward the gap labelled in dotted lines may reduce compared to FIG. 31. As a result, as illustrated in FIG. 37, the gap between a white distribution and a black distribution may become approximately 2.5V even when considering the change of Vt caused by the traps. This may be even wider than the 2V gap in FIG. 32. Thus, it is known that the effect provided by the embodiment may be even better along with the miniaturization of the devices. Generally, the memory cells may have the goal of eliminating the fluctuation of the Vt distribution; whereas, on the contrary, the embodiment aims to increase the fluctuation and the physical randomness caused by the miniaturization.

The Third Embodiment

Figure 38:
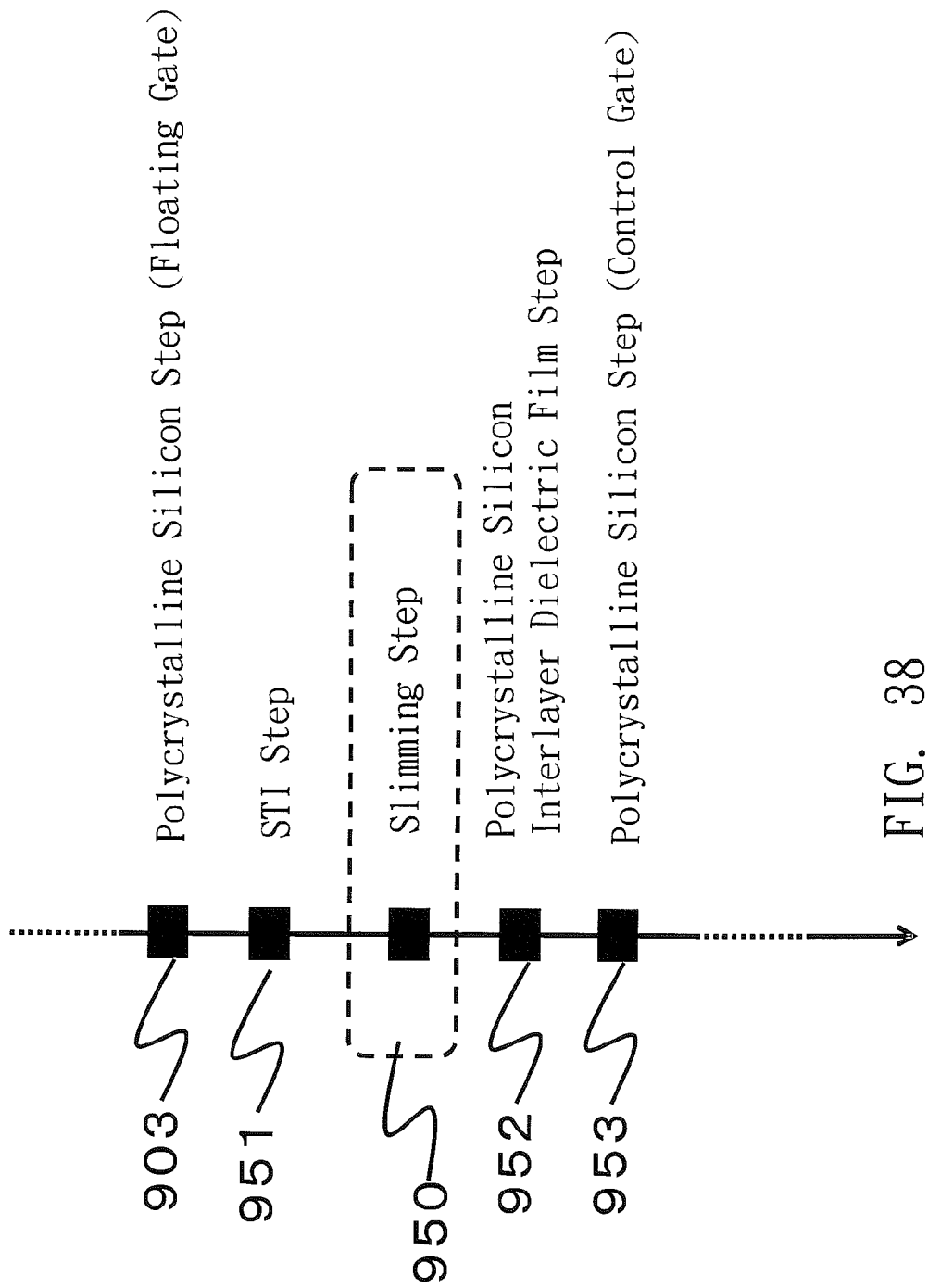
FIG. 38 is a diagrammatic view of the manufacturing process in the third embodiment of the disclosure.

FIG. 38 presents the third embodiment featuring a slimming step 950. Adding into the standard manufacturing process the slimming step 950, after the polycrystalline silicon step (floating gate) 903 and a shallow trench isolation (STI) step 951 forming the comb-structure on the substrate surface, and may return to the standard manufacturing process by continuing a polycrystalline silicon interlayer dielectric film step 952 and a polycrystalline silicon step (control gate) 953. For example, the slimming step 950 may be one of the thermal oxidation processes.

Figure 39:
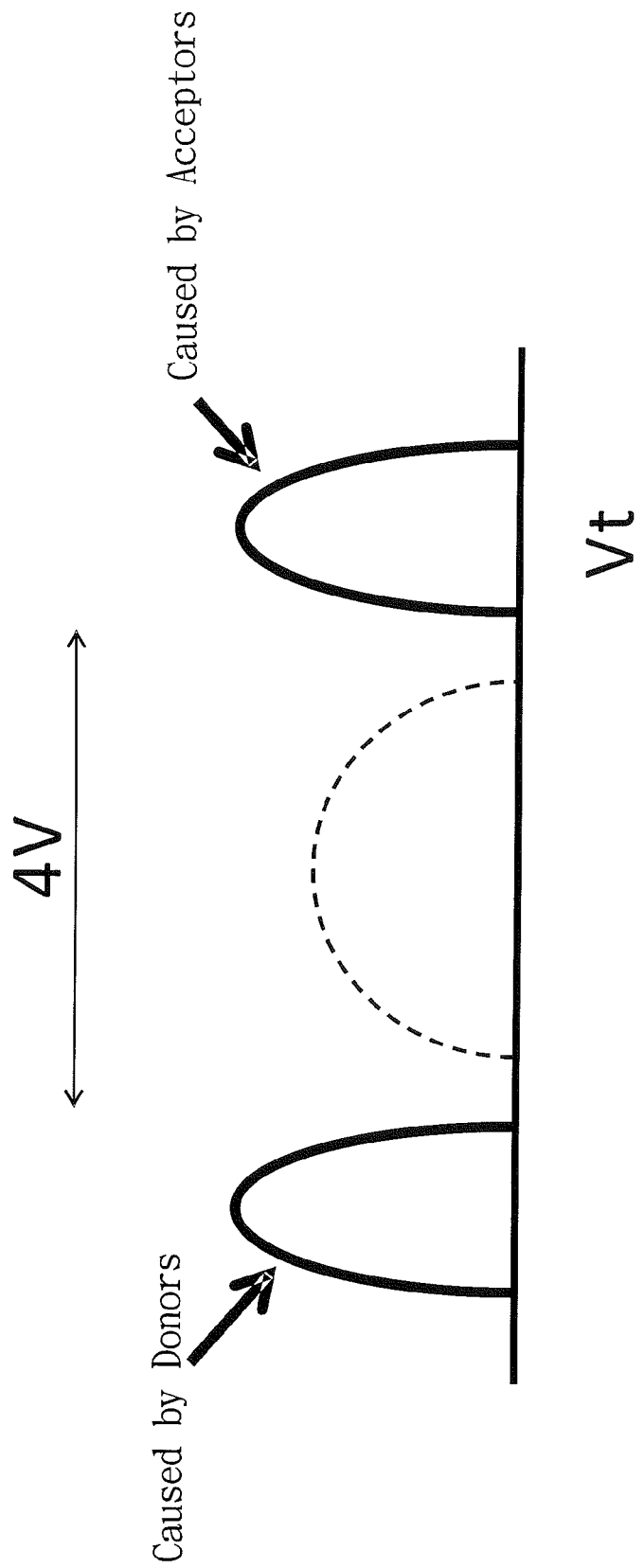
FIG. 39 is a diagrammatic view of the threshold voltage distribution of the nonvolatile memory cells in the third embodiment of the disclosure.

FIG. 39 shows the threshold voltage distribution after the slimming step 950, featured by the embodiment. By conducting the slimming step 950, the width AA of the active areas 505 may become even narrower. As a result, the change of the peak caused by the donor ions and the change of the peak caused by the acceptor ions may be even bigger. As shown in FIG. 39, three peaks distribute becomes more isolated. In this event, the memory cells corresponding to the center 4V gap in the distribution may be removed by using the same method in the second embodiment; and then FIG. 40 may be obtained. The width of the gap may be approximately 4V for example, which may be wider than the width in FIG. 37. Thus, by using the slimming step 950 featured in the embodiment, the property of input-output reliability may be made sure well.

The Fourth Embodiment

Figure 41:
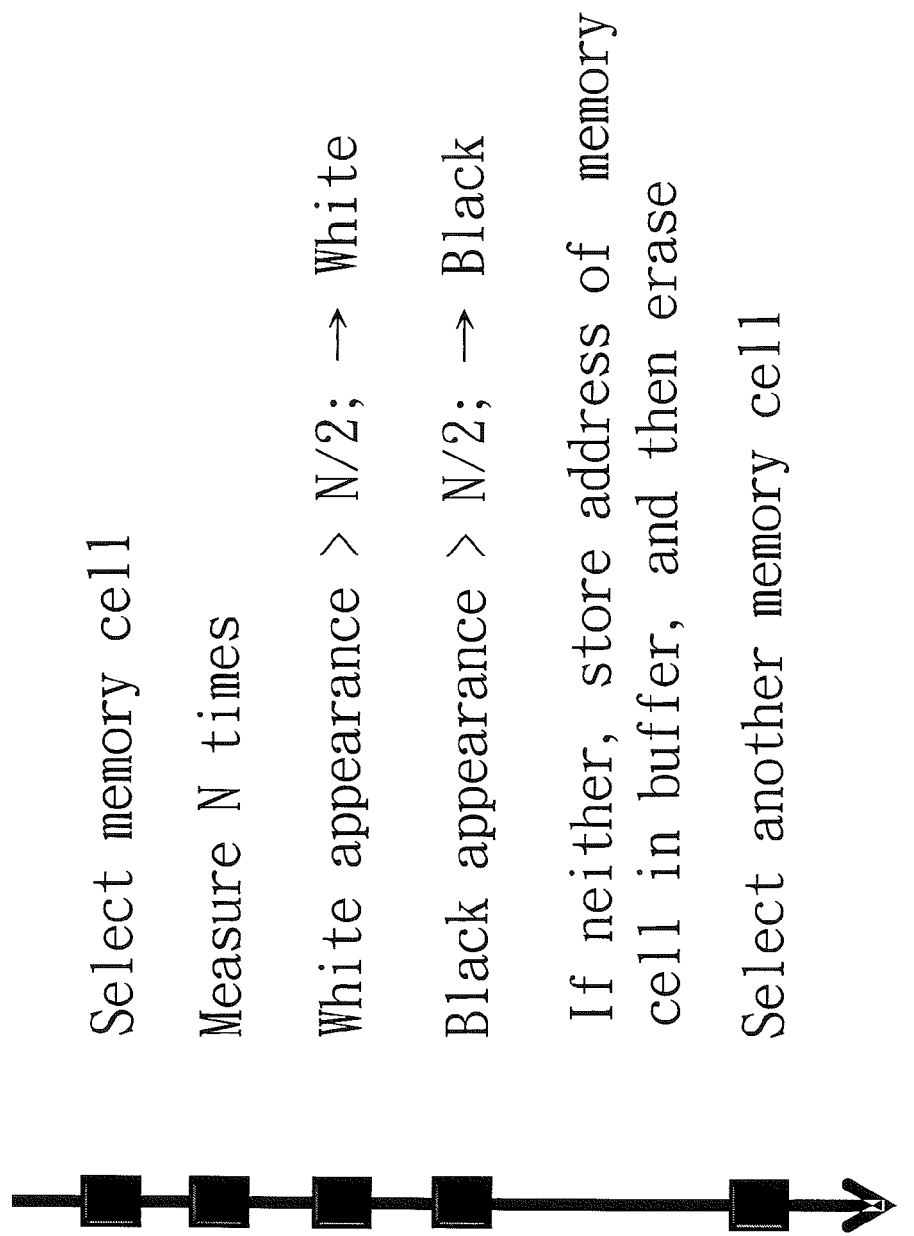
FIG. 41 is a diagrammatic view of a method of reading the threshold voltage in the fourth embodiment of the disclosure.

In the situation that the width AA of the active areas 505 is not sufficiently narrow, the mixed noises may cause the outputs of each read of the same memory cell to vary between white and black. Or, the addresses not stored in the buffer may also generate outputs belong to neither white nor black. In this event, an operation as shown in FIG. 41 may be needed, firstly, the memory cell may be selected to be measured, and the measurement may be then repeated a plurality of times (e.g., N times). Given that N is a natural number larger than 2, if white happens more than N/2 times, the output may be determined white; if black happens more than N/2 times, the output may be determined black; if neither, it may be needed to conduct the operation of storing the address of the memory cell in the buffer, and another memory cell may be selected to be measured.

The Fifth Embodiment

Figure 42:
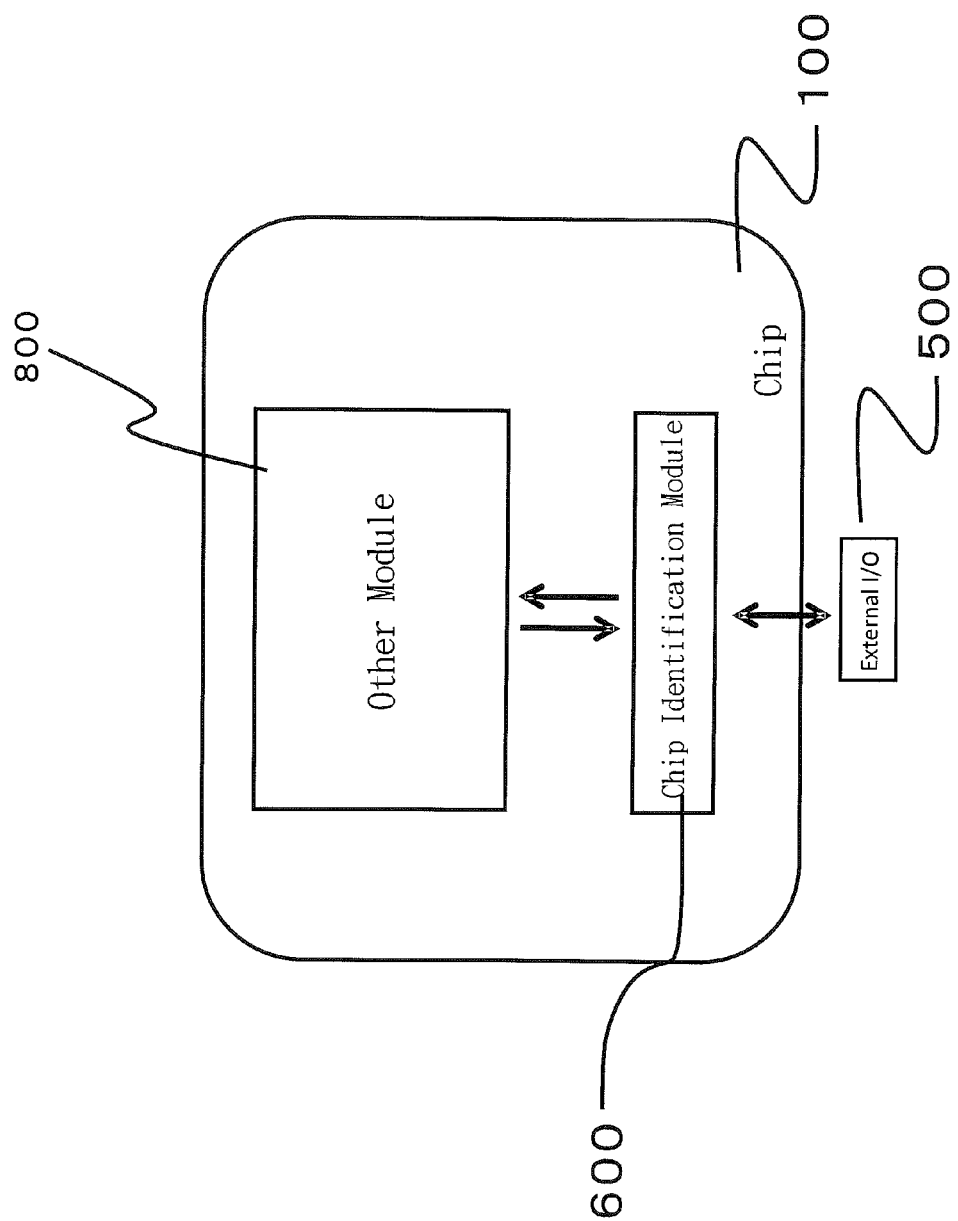
FIG. 42 is a diagrammatic view of the components of the chip in the fifth embodiment.

Referring to FIG. 42, the semiconductor device may comprise a chip including a chip identification module 600, which may have one or more features described above from the first to the fourth embodiments, an external I/O 500, which may interconnect the chip identification model 600 and the external communication, and a module 800 with other functions, which may only communicate with the chip identification module 600. This may be a hybrid chip identification device.

The Sixth Embodiment

Figure 36:
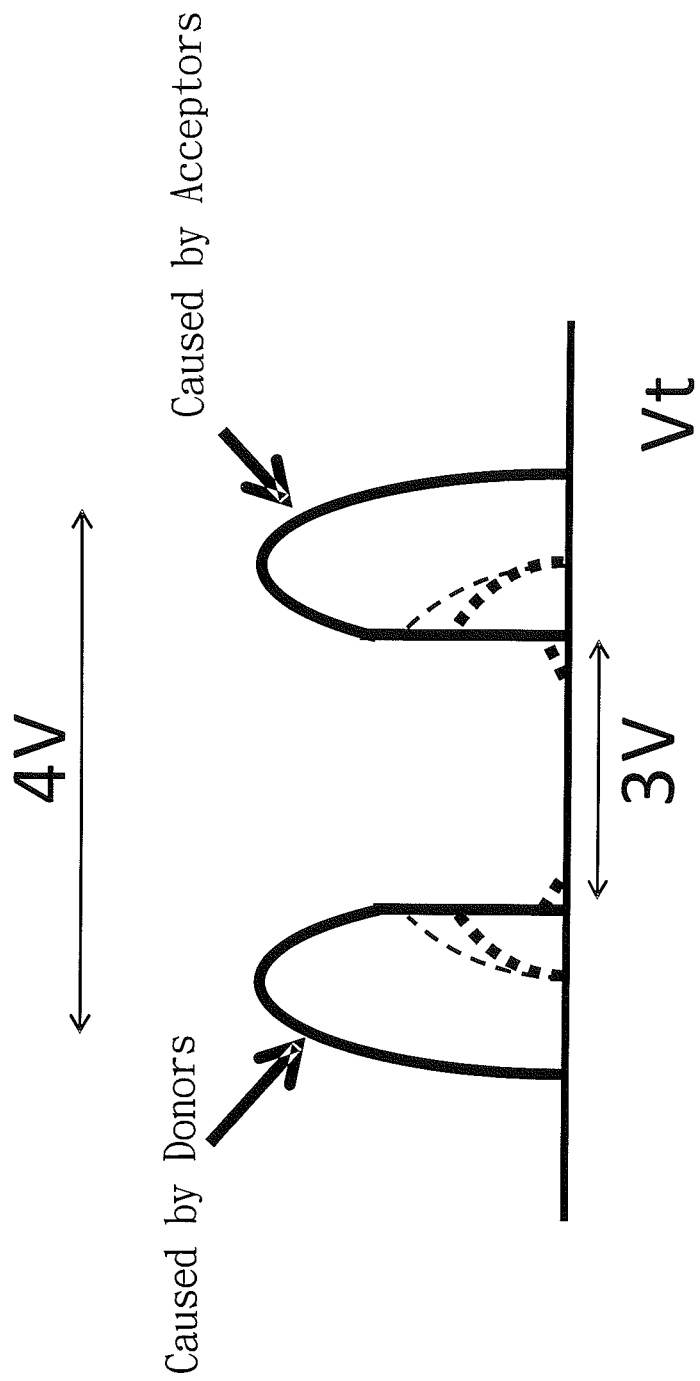
FIG. 36 is a diagrammatic view of the threshold voltage distribution of the nonvolatile memory cells in the second embodiment of the disclosure.
Figure 37:
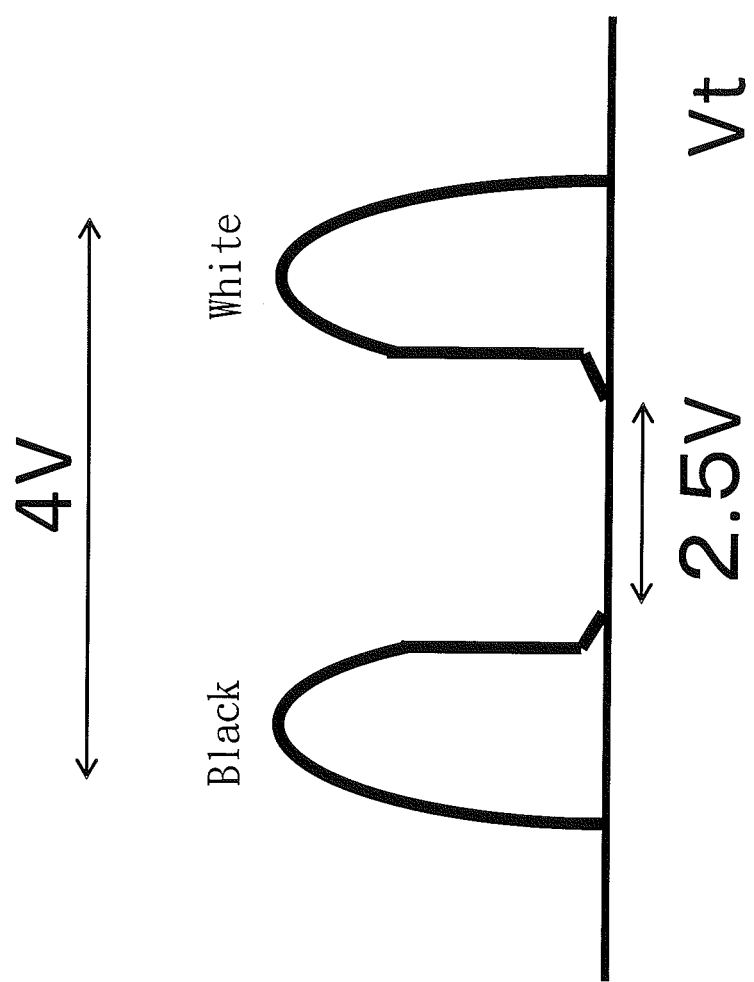
FIG. 37 is a diagrammatic view of the threshold voltage distribution of the nonvolatile memory cells in the second embodiment of the disclosure.
Figure 40:
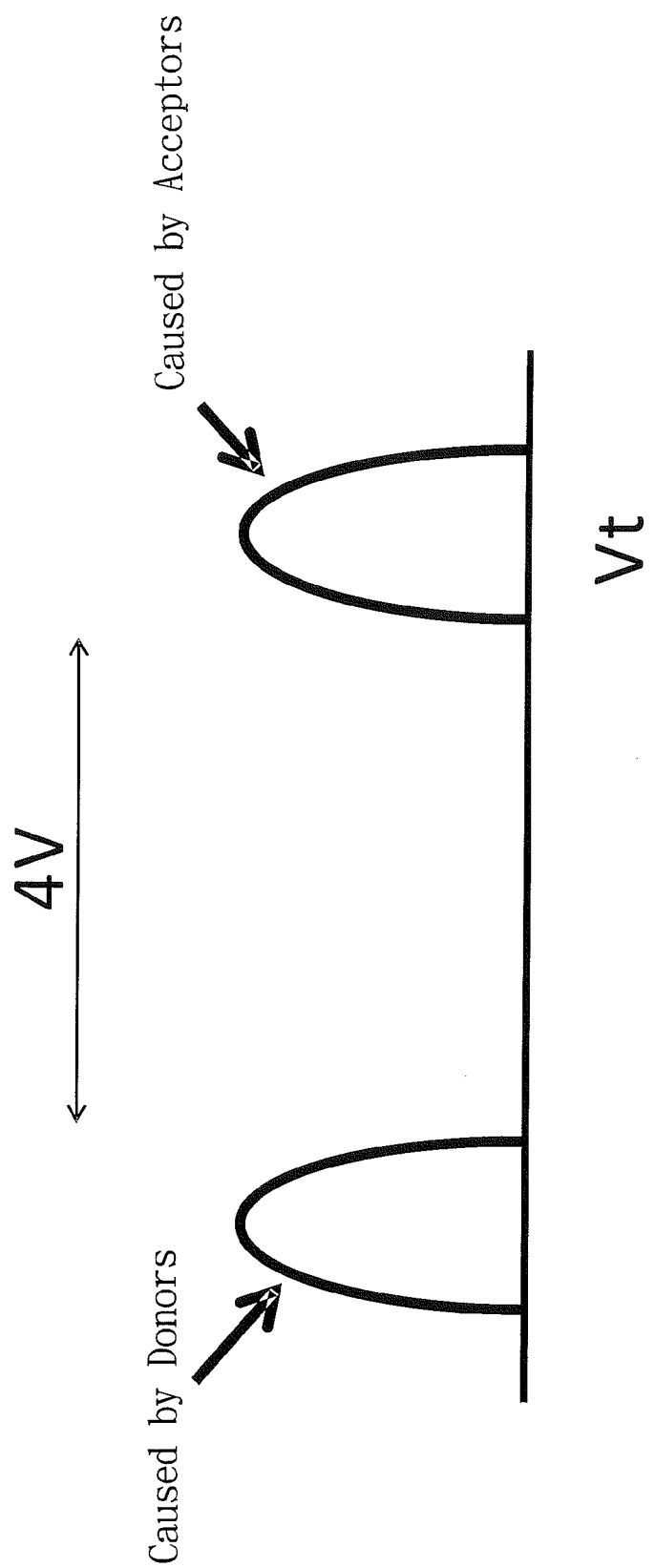
FIG. 40 is a diagrammatic view of the threshold voltage distribution of the nonvolatile memory cells in the third embodiment of the disclosure.
Figure 43:
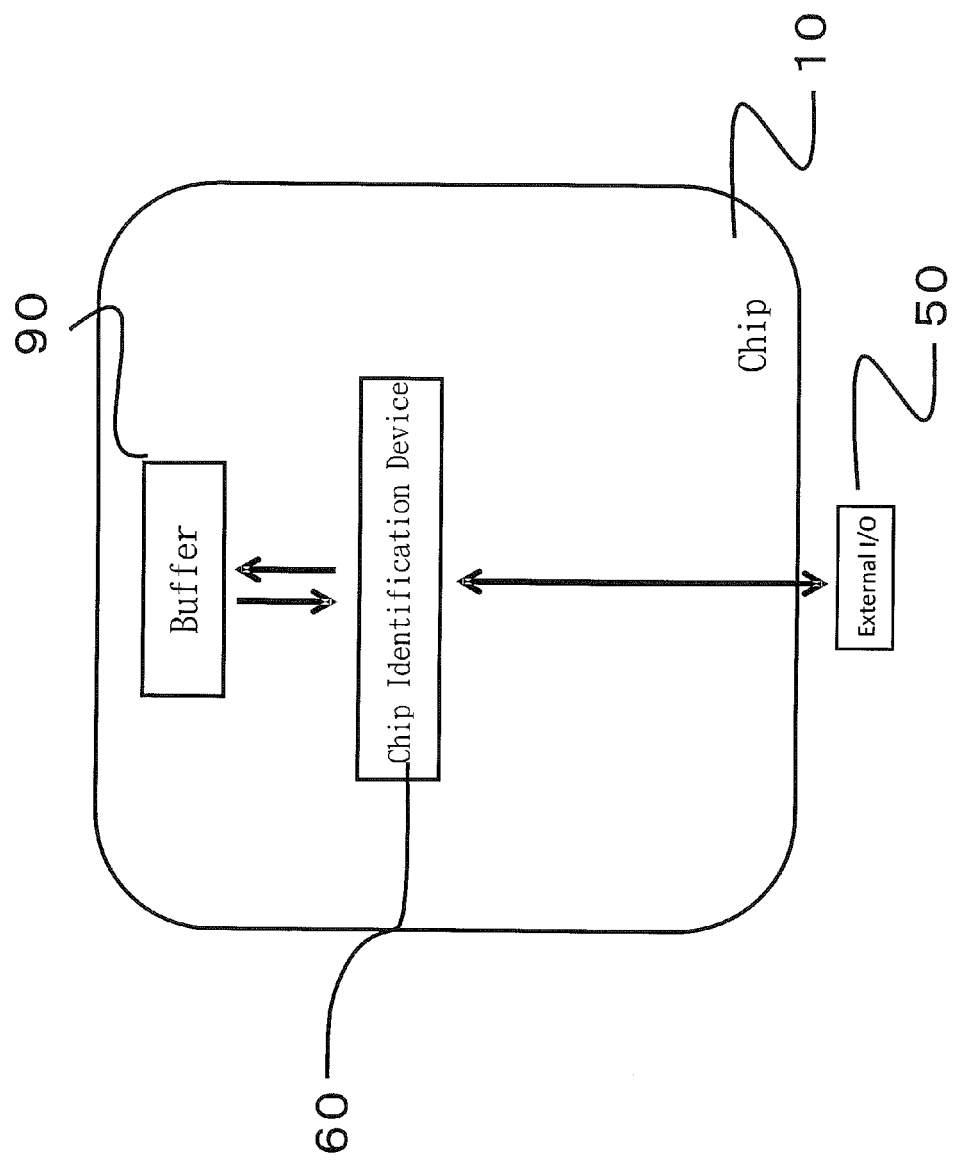
FIG. 43 is a diagrammatic view of the components of the chip in the sixth embodiment.
Figure 44:
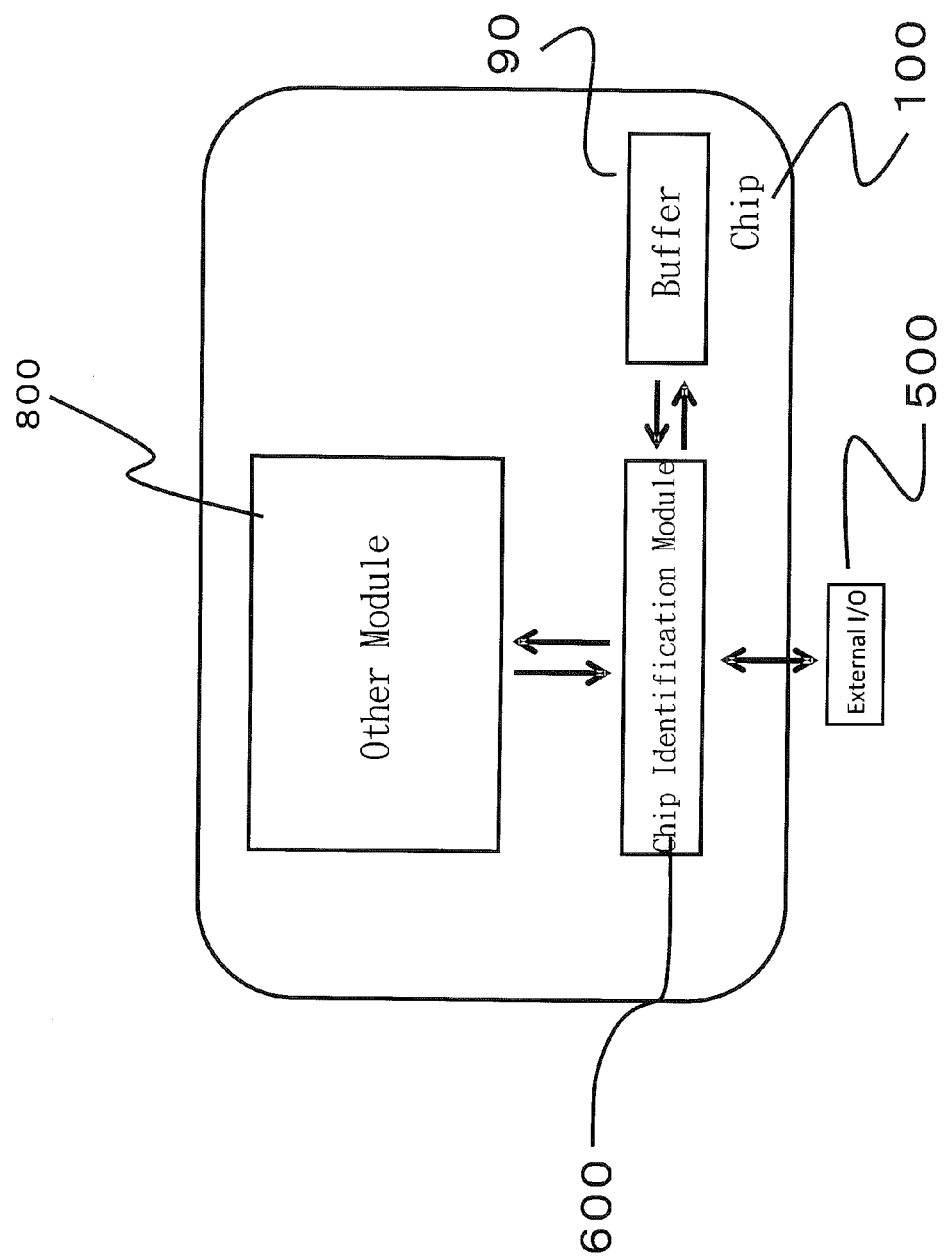
FIG. 44 is a diagrammatic view of the components of the chip in the sixth embodiment.

As shown in FIG. 30, FIG. 36, and FIG. 40, the method of removing the cells from the center of the threshold voltage distribution is described below. For example, a standalone chip identification device having only the chip identification function, as shown in FIG. 43, the addresses of the memory cells that are to be removed may be recorded in the buffer 90, and the addresses of the memory cells that are to be referred by the pages orderly selected by the input passcodes may be compared with the addresses independently recorded in the buffer 90 at the previous step. If the two addresses match, the corresponding memory cell may not compose the output codes of the chip identification device 60. As for the hybrid chip identification device having functions other than the chip identification function, as shown in FIG. 44, the addresses of the memory cells that are to be removed may be recorded in the buffer 90, and the addresses of the memory cells that are to be referred by the pages orderly selected by the input passcodes may be compared with the addresses independently recorded in the buffer 90 at the previous step. If the two addresses match, the corresponding memory cell may not compose the output codes of the chip identification module 600.

According to the disclosure, by distinguishing a network of electronic appliance between peripheral devices and stem servers managing the registration condition of the peripheral devices, having the stem servers serve as the central control with software, and having the peripheral devices unreached by the central control have physical chip identification devices, and then ensuring the security of the whole system using both of software and hardware, the remote attacks on the peripheral devices may be efficiently precluded.

The mutual identification among the connected devices in a network, most of which devices are peripheral devices unreached by the central control, may be securely realized by the chip level authentication without using any algorithm.

Although the disclosure has been described in detail with the reference to its presently preferable embodiments, it will be understood by one of ordinary skill in the art that various modifications can be made without departing from the spirit and the scope of the disclosure, as set forth in the appended claims.

What is claimed is:

1. A network of electronic appliance divided into a plurality of network units, each comprising:
    a stem server; and
    a plurality of peripheral devices only connected to the stem server,
    wherein in the network unit, the stem server includes at least a passcode and a list of registration codes formed with a plurality of the registration codes corresponding to each of the peripheral devices connected to the stem server, and the registration codes are generated in response to the passcodes by using intrinsic physical randomness of each of the peripheral devices, and stored in the stem server in advance, wherein each of the peripheral devices carries a different chip identification device sending output signals to the stem server in response to the passcodes received from the stem server, and the output signals are generated based on the intrinsic physical randomness of each of the peripheral devices, wherein the stem server compares each of the output signals with the list of the registration codes, and determine a certification of each of the peripheral devices, and wherein each of the stem servers conduct an inspection process, wherein the inspection process includes a step of reading internal memories of the peripheral devices connecting to the stem server, a step of comparing with the passcodes stored in the stem server, a step of determining whether identical codes are present, if not present, determining as certificated, if present, further inspecting whether identical codes present among the registration codes in the list of registration codes stored in the stem server, if not present, determining as certificated, if present, determining as uncertificated, wherein the inspection process is conducted on all of the peripheral devices connected to the stem server.

2. The network of electronic appliance as claimed in claim 1, wherein the network comprises a plurality of stem servers and a plurality of peripheral devices, and the peripheral devices have the chip identification devices, respectively, wherein the stem servers output different passcodes, respectively, each of the chip identification devices receives those different passcodes and then generates different signals in response to the different passcodes, and then returns the signals to the stem servers, respectively.

3. A semiconductor device, as the chip identification device claimed in claim 1, comprising:
an array of nonvolatile memory cells disposed at intersections of a plurality of bit lines and a plurality of word lines;
wherein at least one word line is selected to generate an output code from data thereof, output code is generated from a combination of data read from the bit lines with regard to each of the selected word lines, wherein the word lines are selected with regard to the arrangement of data in the input code, wherein the output code is a combination of data arranged in rows related to column numbers of the nonvolatile memory cells in response to the selected word lines and their order determined by the input codes.

4. A semiconductor device, as the chip identification device claimed in claim 2, comprising:
an array of nonvolatile memory cells disposed at intersections of a plurality of bit lines and a plurality of word lines;
wherein at least one word line is selected to generate an output code from data thereof, output code is generated from a combination of data read from the bit lines with regard to each of the selected word lines, wherein the word lines are selected with regard to the arrangement of data in the input code, wherein the output code is a combination of data arranged in rows related to column numbers of the nonvolatile memory cells in response to the selected word lines and their order determined by the input codes.

* * * * *